(12) United States Patent
Sidlauskas et al.

(10) Patent No.: US 7,801,339 B2
(45) Date of Patent: *Sep. 21, 2010

(54) BIOMETRICS WITH SPATIOSPECTRAL SPOOF DETECTION

(75) Inventors: David P. Sidlauskas, Los Gatos, CA (US); Kristin A. Nixon, Albuquerque, NM (US); Robert K. Rowe, Corrales, NM (US)

(73) Assignee: Lumidigm, Inc., Albuquerque, NM (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/461,253

(22) Filed: Jul. 31, 2006

(65) Prior Publication Data

US 2008/0025580 A1 Jan. 31, 2008

(51) Int. Cl.
G06K 9/00 (2006.01)

(52) U.S. Cl. .................. 382/124; 382/115; 340/5.53; 340/5.83

(58) Field of Classification Search .......... 382/115, 382/124, 125; 340/5.53, 5.83
See application file for complete search history.

(56) References Cited

U.S. PATENT DOCUMENTS

| | | | |
|---|---|---|---|
| 3,508,830 A | 4/1970 | Hopkins et al. | |
| 3,854,319 A | 12/1974 | Burroughs et al. | |
| 3,872,443 A | 3/1975 | Ott | |
| 3,910,701 A | 10/1975 | Henderson et al. | |
| RE29,008 E | 10/1976 | Ott | |
| 4,035,083 A | 7/1977 | Woodriff et al. | |
| 4,142,797 A | 3/1979 | Astheimer | |
| 4,169,676 A | 10/1979 | Kaiser | |
| 4,170,987 A | 10/1979 | Anselmo et al. | |
| 4,260,220 A | 4/1981 | Whitehead | |
| 4,322,163 A | 3/1982 | Schiller | |
| 4,427,889 A | 1/1984 | Muller | |
| 4,537,484 A | 8/1985 | Fowler | |
| 4,598,715 A | 7/1986 | Machler et al. | |
| 4,653,880 A | 3/1987 | Sting et al. | |
| 4,654,530 A | 3/1987 | Dybwad | |
| 4,655,225 A | 4/1987 | Dahne et al. | |
| 4,656,562 A | 4/1987 | Sugino | |
| 4,657,397 A | 4/1987 | Oehler et al. | |

(Continued)

FOREIGN PATENT DOCUMENTS

DE 10153808 5/2003

(Continued)

OTHER PUBLICATIONS

Brochure entitled "Improve the Clinical Outcome of Every Patient", In Line Diagnostics, publish on or before Oct. 30, 1997, 2 pages.

(Continued)

*Primary Examiner*—John B Strege
(74) *Attorney, Agent, or Firm*—Townsend and Townsend and Crew LLP

(57) ABSTRACT

Methods and apparatus are described for performing a biometric function on a purported skin site. The site is illuminated under distinct optical conditions and light reflected from the site is received. A feature value for several features is derived from the received light, permitting a comparison to be performed with reference feature values. Whether the purported skin site is a true skin site is determined from the comparison.

26 Claims, 13 Drawing Sheets

U.S. PATENT DOCUMENTS

| | | |
|---|---|---|
| 4,661,706 A | 4/1987 | Messerschmidt et al. |
| 4,684,255 A | 8/1987 | Ford |
| 4,699,149 A | 10/1987 | Rice |
| 4,712,912 A | 12/1987 | Messerschmidt |
| 4,730,882 A | 3/1988 | Messerschmidt |
| 4,747,147 A | 5/1988 | Sparrow |
| 4,787,013 A | 11/1988 | Sugino et al. |
| 4,787,708 A | 11/1988 | Whitehead |
| 4,830,496 A | 5/1989 | Young |
| 4,853,542 A | 8/1989 | Milosevic et al. |
| 4,857,735 A | 8/1989 | Noller |
| 4,859,064 A | 8/1989 | Messerschmidt et al. |
| 4,866,644 A | 9/1989 | Shenk et al. |
| 4,867,557 A | 9/1989 | Takatani et al. |
| 4,882,492 A | 11/1989 | Schlager |
| 4,883,953 A | 11/1989 | Koashi et al. |
| 4,936,680 A | 6/1990 | Henkes et al. |
| 4,944,021 A | 7/1990 | Hoshino et al. |
| 4,975,581 A | 12/1990 | Robinson et al. |
| 5,015,100 A | 5/1991 | Doyle |
| 5,019,715 A | 5/1991 | Sting et al. |
| 5,028,787 A | 7/1991 | Rosenthal et al. |
| 5,051,602 A | 9/1991 | Sting et al. |
| 5,055,658 A | 10/1991 | Cockburn |
| 5,068,536 A | 11/1991 | Rosenthal |
| 5,070,874 A | 12/1991 | Barnes et al. |
| 5,077,803 A | 12/1991 | Kato et al. |
| 5,109,428 A | 4/1992 | Igaki et al. |
| 5,146,102 A | 9/1992 | Higuchi et al. |
| 5,158,082 A | 10/1992 | Jones |
| 5,163,094 A | 11/1992 | Prokoski et al. |
| 5,177,802 A | 1/1993 | Fujimoto et al. |
| 5,178,142 A | 1/1993 | Harjunmaa et al. |
| 5,179,951 A | 1/1993 | Knudson |
| 5,204,532 A | 4/1993 | Rosenthal |
| 5,222,495 A | 6/1993 | Clarke et al. |
| 5,222,496 A | 6/1993 | Clarke et al. |
| 5,223,715 A | 6/1993 | Taylor |
| 5,225,678 A | 7/1993 | Messerschmidt |
| 5,230,702 A | 7/1993 | Lindsay et al. |
| 5,237,178 A | 8/1993 | Rosenthal et al. |
| 5,243,546 A | 9/1993 | Maggard |
| 5,257,086 A | 10/1993 | Fateley et al. |
| 5,258,922 A | 11/1993 | Grill |
| 5,267,152 A | 11/1993 | Yang et al. |
| 5,268,749 A | 12/1993 | Weber et al. |
| 5,291,560 A | 3/1994 | Daugman |
| 5,299,570 A | 4/1994 | Hatschek |
| 5,303,026 A | 4/1994 | Strobl et al. |
| 5,311,021 A | 5/1994 | Messerschmidt |
| 5,313,941 A | 5/1994 | Braig et al. |
| 5,321,265 A | 6/1994 | Block |
| 5,331,958 A | 7/1994 | Oppenheimer |
| 5,348,003 A | 9/1994 | Caro |
| 5,351,686 A | 10/1994 | Steuer et al. |
| 5,355,880 A | 10/1994 | Thomas et al. |
| 5,360,004 A | 11/1994 | Purdy et al. |
| 5,361,758 A | 11/1994 | Hall et al. |
| 5,366,903 A | 11/1994 | Lundsgaard et al. |
| 5,372,135 A | 12/1994 | Mendelson et al. |
| 5,379,764 A | 1/1995 | Barnes et al. |
| 5,402,778 A | 4/1995 | Chance |
| 5,405,315 A | 4/1995 | Khuri et al. |
| 5,413,096 A | 5/1995 | Benaron et al. |
| 5,413,098 A | 5/1995 | Benaron et al. |
| 5,419,321 A | 5/1995 | Evans |
| 5,435,309 A | 7/1995 | Thomas et al. |
| 5,441,053 A | 8/1995 | Lodder et al. |
| 5,452,723 A | 9/1995 | Wu et al. |
| 5,459,317 A | 10/1995 | Small et al. |
| 5,459,677 A | 10/1995 | Kowalski et al. |
| 5,460,177 A | 10/1995 | Purdy et al. |
| 5,483,335 A | 1/1996 | Tobias |
| 5,494,032 A | 2/1996 | Robinson et al. |
| 5,505,726 A | 4/1996 | Meserol |
| 5,507,723 A | 4/1996 | Keshaviah |
| 5,515,847 A | 5/1996 | Braig et al. |
| 5,518,623 A | 5/1996 | Keshaviah et al. |
| 5,523,054 A | 6/1996 | Switalski et al. |
| 5,533,509 A | 7/1996 | Koashi et al. |
| 5,537,208 A | 7/1996 | Bertram et al. |
| 5,539,207 A | 7/1996 | Wong et al. |
| 5,552,997 A | 9/1996 | Massart |
| 5,559,504 A | 9/1996 | Itsumi et al. |
| 5,568,251 A | 10/1996 | Davies et al. |
| 5,596,992 A | 1/1997 | Haaland et al. |
| 5,606,164 A | 2/1997 | Price et al. |
| 5,613,014 A | 3/1997 | Eshera et al. |
| 5,630,413 A | 5/1997 | Thomas et al. |
| 5,636,633 A | 6/1997 | Messerschmidt et al. |
| 5,655,530 A | 8/1997 | Messerschmidt |
| 5,672,864 A | 9/1997 | Kaplan |
| 5,672,875 A | 9/1997 | Block et al. |
| 5,677,762 A | 10/1997 | Ortyn et al. |
| 5,681,273 A | 10/1997 | Brown |
| 5,708,593 A | 1/1998 | Saby et al. |
| 5,719,399 A | 2/1998 | Alfano et al. |
| 5,719,950 A | 2/1998 | Osten et al. |
| 5,724,268 A | 3/1998 | Sodickson et al. |
| 5,729,619 A | 3/1998 | Puma |
| 5,737,439 A | 4/1998 | Lapsley et al. |
| 5,743,262 A | 4/1998 | Lepper, Jr. et al. |
| 5,747,806 A | 5/1998 | Khalil |
| 5,750,994 A | 5/1998 | Schlager |
| 5,751,835 A | 5/1998 | Topping et al. |
| 5,751,836 A | 5/1998 | Wildes et al. |
| 5,761,330 A | 6/1998 | Stoianov et al. |
| 5,782,755 A | 7/1998 | Chance et al. |
| 5,792,050 A | 8/1998 | Alam et al. |
| 5,792,053 A | 8/1998 | Skladnev et al. |
| 5,793,881 A | 8/1998 | Stiver et al. |
| 5,796,858 A | 8/1998 | Zhou et al. |
| 5,808,739 A | 9/1998 | Turner et al. |
| 5,818,048 A | 10/1998 | Sodickson et al. |
| 5,823,951 A | 10/1998 | Messerschmidt et al. |
| 5,828,066 A | 10/1998 | Messerschmidt |
| 5,830,132 A | 11/1998 | Robinson |
| 5,830,133 A | 11/1998 | Osten et al. |
| 5,850,623 A | 12/1998 | Carman, Jr. et al. |
| 5,853,370 A | 12/1998 | Chance et al. |
| 5,857,462 A | 1/1999 | Thomas et al. |
| 5,860,421 A | 1/1999 | Eppstein et al. |
| 5,867,265 A | 2/1999 | Thomas |
| 5,886,347 A | 3/1999 | Inoue et al. |
| 5,902,033 A | 5/1999 | Levis et al. |
| 5,914,780 A | 6/1999 | Turner et al. |
| 5,929,443 A | 7/1999 | Alfano et al. |
| 5,933,792 A | 8/1999 | Anderson et al. |
| 5,935,062 A | 8/1999 | Messerschmidt et al. |
| 5,945,676 A | 8/1999 | Khalil |
| 5,949,543 A | 9/1999 | Bleier et al. |
| 5,957,841 A | 9/1999 | Maruo et al. |
| 5,961,449 A | 10/1999 | Toida et al. |
| 5,963,319 A | 10/1999 | Jarvis et al. |
| 5,987,346 A | 11/1999 | Benaron et al. |
| 5,999,637 A | 12/1999 | Toyoda et al. |
| 6,005,722 A | 12/1999 | Butterworth et al. |
| 6,016,435 A | 1/2000 | Maruo et al. |
| 6,025,597 A | 2/2000 | Sterling et al. |
| 6,026,314 A | 2/2000 | Amerov et al. |
| 6,028,773 A | 2/2000 | Hundt |
| 6,031,609 A | 2/2000 | Funk et al. |
| 6,034,370 A | 3/2000 | Messerschmidt |
| 6,040,578 A | 3/2000 | Malin et al. |

| | | |
|---|---|---|
| 6,041,247 A | 3/2000 | Weckstrom et al. |
| 6,041,410 A | 3/2000 | Hsu et al. |
| 6,043,492 A | 3/2000 | Lee et al. |
| 6,044,285 A | 3/2000 | Chaiken et al. |
| 6,045,502 A | 4/2000 | Eppstein et al. |
| 6,046,808 A | 4/2000 | Fately |
| 6,049,727 A | 4/2000 | Crothall |
| 6,056,738 A | 5/2000 | Marchitto et al. |
| 6,057,925 A | 5/2000 | Anthon |
| 6,061,581 A | 5/2000 | Alam et al. |
| 6,061,582 A | 5/2000 | Small et al. |
| 6,066,847 A | 5/2000 | Rosenthal |
| 6,069,689 A | 5/2000 | Zeng et al. |
| 6,070,093 A | 5/2000 | Oosta et al. |
| 6,073,037 A | 6/2000 | Alam et al. |
| 6,081,612 A | 6/2000 | Gutkowicz-Krusin et al. |
| 6,088,605 A | 7/2000 | Griffith et al. |
| 6,088,607 A | 7/2000 | Diab et al. |
| 6,097,035 A | 8/2000 | Belongie et al. |
| 6,100,811 A | 8/2000 | Hsu et al. |
| 6,115,484 A | 9/2000 | Bowker et al. |
| 6,115,673 A | 9/2000 | Malin et al. |
| 6,122,042 A | 9/2000 | Wunderman et al. |
| 6,122,394 A | 9/2000 | Neukermans et al. |
| 6,122,737 A | 9/2000 | Bjorn et al. |
| 6,125,192 A | 9/2000 | Bjorn et al. |
| 6,141,101 A | 10/2000 | Bleier et al. |
| 6,147,749 A | 11/2000 | Kubo et al. |
| 6,148,094 A | 11/2000 | Kinsella |
| 6,152,876 A | 11/2000 | Robinson et al. |
| 6,154,658 A | 11/2000 | Caci |
| 6,157,041 A | 12/2000 | Thomas et al. |
| 6,159,147 A | 12/2000 | Lichter et al. |
| 6,172,743 B1 | 1/2001 | Kley et al. |
| 6,175,407 B1 | 1/2001 | Sartor |
| 6,181,414 B1 | 1/2001 | Raz et al. |
| 6,181,958 B1 | 1/2001 | Steuer et al. |
| 6,188,781 B1 | 2/2001 | Brownlee |
| 6,208,749 B1 | 3/2001 | Gutkowicz-Krusin |
| 6,212,424 B1 | 4/2001 | Robinson |
| 6,226,541 B1 | 5/2001 | Eppstein et al. |
| 6,229,908 B1 | 5/2001 | Edmonds et al. |
| 6,230,034 B1 | 5/2001 | Messerschmidt et al. |
| 6,236,047 B1 | 5/2001 | Malin et al. |
| 6,240,306 B1 | 5/2001 | Rohrscheib et al. |
| 6,240,309 B1 | 5/2001 | Yamashita et al. |
| 6,241,663 B1 | 6/2001 | Wu et al. |
| 6,256,523 B1 | 7/2001 | Diab et al. |
| 6,272,367 B1 | 8/2001 | Chance |
| 6,280,381 B1 | 8/2001 | Malin et al. |
| 6,282,303 B1 | 8/2001 | Brownlee |
| 6,285,895 B1 | 9/2001 | Ristolainen et al. |
| 6,292,576 B1 | 9/2001 | Brownlee |
| 6,301,375 B1 | 10/2001 | Choi |
| 6,301,815 B1 | 10/2001 | Sliwa |
| 6,304,767 B1 | 10/2001 | Soller et al. |
| 6,307,633 B1 | 10/2001 | Mandella et al. |
| 6,309,884 B1 | 10/2001 | Cooper et al. |
| 6,317,507 B1 | 11/2001 | Dolfing et al. |
| 6,324,310 B1 | 11/2001 | Brownlee |
| 6,330,346 B1 | 12/2001 | Peterson et al. |
| 6,404,904 B1 | 6/2002 | Einighammer et al. |
| 6,419,361 B2 | 7/2002 | Cabib et al. |
| 6,483,929 B1 | 11/2002 | Murakami et al. |
| 6,504,614 B1 | 1/2003 | Messerschmidt et al. |
| 6,537,225 B1 | 3/2003 | Mills |
| 6,560,352 B2 | 5/2003 | Rowe et al. |
| 6,574,490 B2 | 6/2003 | Abbink et al. |
| 6,606,509 B2 | 8/2003 | Schmitt |
| 6,628,809 B1 | 9/2003 | Rowe et al. |
| 6,631,199 B1 | 10/2003 | Topping et al. |
| 6,741,729 B2 | 5/2004 | Bjorn et al. |
| 6,799,275 B1 | 9/2004 | Bjorn |
| 6,799,726 B2 | 10/2004 | Stockhammer |
| 6,816,605 B2 | 11/2004 | Rowe et al. |
| 6,825,930 B2 | 11/2004 | Cronin et al. |
| 6,928,181 B2 | 8/2005 | Brooks |
| 6,937,885 B1 | 8/2005 | Lewis et al. |
| 6,958,194 B1 | 10/2005 | Hopper et al. |
| 6,995,384 B2 | 2/2006 | Lee et al. |
| 7,147,153 B2 | 12/2006 | Rowe et al. |
| 7,347,365 B2 | 3/2008 | Rowe |
| 2002/0009213 A1 | 1/2002 | Rowe et al. |
| 2002/0101566 A1 | 8/2002 | Elsner et al. |
| 2002/0171834 A1 | 11/2002 | Rowe et al. |
| 2002/0183624 A1 | 12/2002 | Rowe et al. |
| 2003/0044051 A1 | 3/2003 | Fujieda |
| 2003/0078504 A1 | 4/2003 | Rowe |
| 2003/0163710 A1 | 8/2003 | Ortiz et al. |
| 2003/0223621 A1 | 12/2003 | Rowe et al. |
| 2004/0008875 A1 | 1/2004 | Linares |
| 2004/0047493 A1 | 3/2004 | Rowe et al. |
| 2004/0114783 A1 | 6/2004 | Spycher et al. |
| 2004/0125994 A1 | 7/2004 | Engels et al. |
| 2004/0179722 A1 | 9/2004 | Moritoki et al. |
| 2004/0240712 A1 | 12/2004 | Rowe et al. |
| 2005/0007582 A1 | 1/2005 | Villers et al. |
| 2005/0125339 A1 | 6/2005 | Tidwell et al. |
| 2005/0169504 A1 | 8/2005 | Black |
| 2005/0180620 A1 | 8/2005 | Takiguchi |
| 2005/0185847 A1 | 8/2005 | Rowe |
| 2005/0205667 A1 | 9/2005 | Rowe |
| 2005/0265585 A1 | 12/2005 | Rowe |
| 2005/0265586 A1 | 12/2005 | Rowe et al. |
| 2005/0265607 A1 | 12/2005 | Chang |
| 2005/0271258 A1 | 12/2005 | Rowe |
| 2006/0002597 A1 | 1/2006 | Rowe |
| 2006/0002598 A1 | 1/2006 | Rowe et al. |
| 2006/0062438 A1 | 3/2006 | Rowe |
| 2006/0110015 A1 | 5/2006 | Rowe |
| 2006/0115128 A1 | 6/2006 | Mainguet |
| 2006/0202028 A1 | 9/2006 | Rowe |
| 2006/0210120 A1 | 9/2006 | Rowe |
| 2006/0274921 A1 | 12/2006 | Rowe |

FOREIGN PATENT DOCUMENTS

| | | |
|---|---|---|
| EP | 0 280 418 A1 | 8/1988 |
| EP | 0 372 748 | 6/1990 |
| EP | 0 897 164 A2 | 2/1999 |
| EP | 0 924 656 A2 | 6/1999 |
| EP | 1 353 292 | 10/2003 |
| EP | 1 434 162 A2 | 6/2004 |
| FR | 2761180 A1 | 9/1998 |
| JP | 2001-184490 A | 7/2001 |
| JP | 2002-133402 A | 5/2002 |
| JP | 2003-308520 A | 10/2003 |
| WO | WO 92/00513 A1 | 1/1992 |
| WO | WO 92/17765 A1 | 10/1992 |
| WO | WO 93/07801 A1 | 4/1993 |
| WO | WO 01/18332 A1 | 3/2001 |
| WO | WO 01/27882 A2 | 4/2001 |
| WO | WO 01/52180 A1 | 7/2001 |
| WO | WO 01/52726 A1 | 7/2001 |
| WO | WO 01/53805 A1 | 7/2001 |
| WO | WO 01/65471 A | 9/2001 |
| WO | WO 02/084605 A2 | 10/2002 |
| WO | WO 02/099393 A2 | 12/2002 |
| WO | WO 03/096272 A1 | 11/2003 |
| WO | WO 2004/068388 A2 | 8/2004 |
| WO | WO 2004/068394 A1 | 8/2004 |
| WO | WO 2004/090786 | 10/2004 |

WO WO 2006/049394 A 5/2006

OTHER PUBLICATIONS

Lee et al., "Fingerprint Recognition Using Principal Gabor Basis Function", Proceedings of 2001 International Symposium on Intelligent Multimedia, Video and Speech Processing, May 2-4, 2001, Sections 2-3.

Nixon, Kristin A. et al., "Novel Spectroscopy-Based Technology for Biometric and Liveness Verification", Technology for Human Identification. Proceedings od SPIE, vol. 5404, No. 1, XP-002458441, Apr. 12-13, 2004, pp. 287-295 (ISSN: 0277-786x).

Pan et al., "Face Recognition in Hyperspectral Images", IEEE Transactions on Pattern Analysis and Machine Intelligence vol. 25, No. 12, Dec. 2003.

Ross et al., "A Hybrid Fingerprint Matcher," Pattern Recognition 36, The Journal of the Pattern Recognition Society, 2003 Elsevier Science Ltd., pp. 1661-1673.

Selvaraj et al., Fingerprint Verification Using Wavelet Transform, Proceedings of the Fifth International Conference on Computational Intelligence and Multimedia Applications, IEEE, 2003.

PCT International Search Report mailed Sep. 29, 2008, Application No. PCT/US07/74747, 8 pages.

Anderson, C. E. et al., "Fundamentals of Calibration Transfer Through Procrustes Analysis," Appln. Spectros., vol. 53, No. 10 (1999) p. 1268-1276.

Ashbourn, Julian, Biometrics; Advanced Identity Verification, Springer, 2000, pp. 63-64).

Bantle, John P. et al., "Glucose Measurement in Patients With Diabetes Mellitus With Dermal Interstitial Fluid," Mosby-Year Book, Inc., 9 pages, 1997.

Berkoben, Michael S. et al., "Vascular Access for Hemodialysis," Clinical Dialysis, Third Edition, pp. 2 cover pages and 26-45, 1995.

Blank, T.B. et al., "Transfer of Near-Infrared Multivariate Calibrations Without Standards," Anal. Chem., vol. 68 (1996) p. 2987.

Bleyer, Anthony J. et al., "The Costs of Hospitalizations Due to Hemodialysis Access Managements," Nephrology News & Issues, pp. 19, 20 and 22, Jan. 1995.

Brasunas John C. et al., "Uniform Time-Sampling Fourier Transform Spectroscopy," Applied Optics, vol. 36, No. 10, Apr. 1, 1997, pp. 2206-2210.

Brault, James W., "New Approach to High-Precision Fourier Transform Spectrometer Design," Applied Optics, Vo. 35, No. 16, Jun. 1, 1996, pp. 2891-2896.

Cassarly, W.J. et al., "Distributed Lighting Systems: Uniform Light Delivery," Source Unknown, pp. 1698-1702, 1995.

Chang, Chong-Min et al., "An Uniform Rectangular Illuminating Optical System for Liquid Crystal Light Valve Projectors," Euro Display '96 (1996) pp. 257-260.

Coyne, Lawrence J. et al., "Distributive Fiber Optic couplers Using Rectangular Lightguides as Mixing Elements," (Information Gatekeepers, Inc. Brookline, MA, 1979) pp. 160-164.

Daugirdas, JT et al., "Comparison of Methods to Predict the Equilibrated Kt/V (eKt/V) in the Hemo Study," National Institutes of Health, pp. 1-28, Aug. 20, 1996.

de Noord, Onno E., "Multivariate Calibration Standardization," Chemometrics and intelligent Laboratory Systems 25, (1994) pp. 85-97.

Demos, S.G. et al., "Optical Fingerprinting Using Polarisation Contrast Improvement," Electronics Letters, vol. 33, No. 7, pp. 582-584, Mar. 27, 1997.

Depner, Thomas A. et al., "Clinical Measurement of Blood Flow in Hemodialysis Access Fistulae and Grafts by Ultrasound Dilution," Division of Nephrology, University of California, pp. M745-M748, published on or before Oct. 30, 1997.

Despain, Alvin M. et al., "A Large-Aperture Field-Widened Interferometer-Spectrometer for Airglow Studies," Aspen International Conference on Fourier Spectroscopy, 1970, pp. 293-300.

Faber, Nicolaas, "Multivariate Sensitivity for the Interpretation of the Effect of Spectral Pretreatment Methods on Near-Infrared Calibration Model Predictions," Analytical Chemistry, vol. 71, No. 3, Feb. 1, 1999, pp. 557-565.

Fresenius USA, "Determination of Delivered Therapy Through Measurement of Effective Clearance," 2 pages, Dec. 1994.

Geladi, Paul et al., A Multivariate NIR Study of Skin Alterations in Diabetic Patients as Compared to Control Subjects, J. Near Infrared Spectrosc., vol. 8 (2000) pp. 217-227.

Hakim, Raymond M. et al., "Effects of Dose of Dialysis on Morbidity and Mortality," American Journal of Kidney Diseases, vol. 23, No. 5, pp. 661-669, May 1994.

Jacobs, Paul et al., "A Disposable Urea Sensor for Continuous Monitoring of Hemodialysis Efficiency," ASAIO Journal, pp. M353-M358, 1993.

Keshaviah, Prakash R. et al., "On-Line Monitoring of the Delivery of the Hemodialysis Prescription," Pediatric Nephrology, vol. 9, pp. S2-S8, 1995.

Krivitski, Nikolai M., "Theory and Validation of Access Flow Measurement by Dilution Technique During Hemodialysis," Kidney International, vol. 48, pp. 244-250, 1995.

Marbach, Ralf, "Measurement Techniques for IR Spectroscopic Blood Glucose Determination," Fortschritt Bericht, Series 8: Measurement and Control Technology, No. 346, pp. cover and 1-158, Mar. 28, 1994.

Mardia, K.V. et al., "Chapter 11—Discriminant Analysis," Multivariate Analysis, pp. 2 cover pages and 300-325, 1979.

Nichols, Michael G. et al., "Design and Test of a White-Light, Steady-State Diffuse Reflectance Spectrometer for Determination of Optical Properties of Highly Scattering Systems," Applied Optics, vol. 36, No. 1, pp. 93-104, Jan. 1, 1997.

Ripley, B. D., "Chapter 3—Linear Discriminant Analysis," Pattern Recognition and Neural Networks, pp. 3 cover pages and 91-120, 1996.

Ronco, C. et al., "On-Line Urea Monitoring: A Further Step Towards Adequate Dialysis Prescription and Delivery," The International Journal of Artificial Organs, vol. 18, No. 9, pp. 534-543, 1995.

Service, F. John et al., "Dermal Interstitial Glucose As An indicator Of Ambient Glycemis," Diabetes Care, vol. 20, No. 9, 8 pages, Aug. 1997.

Sherman, Richard A., "Chapter 4—Recirculation in the Hemodialysis Access," Principles and Practice of Dialysis, pp. 2 cover pages and 38-46, 1994.

Sherman, Richard A., "The Measurement of Dialysis Access Recirculation," American Journal of Kidney Diseases, vol. 22, No. 4, pp. 616-621, Oct. 1993.

Steuer, Robert R. et al., "A New Optical Technique for Monitoring Hematocrit and Circulating Blood Volume: Its Application in Renal Dialysis," Dialysis & Transplantation, vol. 22, No. 5, pp. 260-265, May 1993.

Webb, Paul, "Temperatures of Skin, Subcutaneous Tissue, Muscle and Core in Resting Men in Cold, Comfortable and Hot Conditions," European Journal of Applied Physiology, vol. 64, pp. 471-476, 1992.

Zavala, Albert et al., "Using Fingerprint Measures to Predict Other Anthropometric Variables," Human Factors, vol. 17, No. 6, pp. 591-602, 1975.

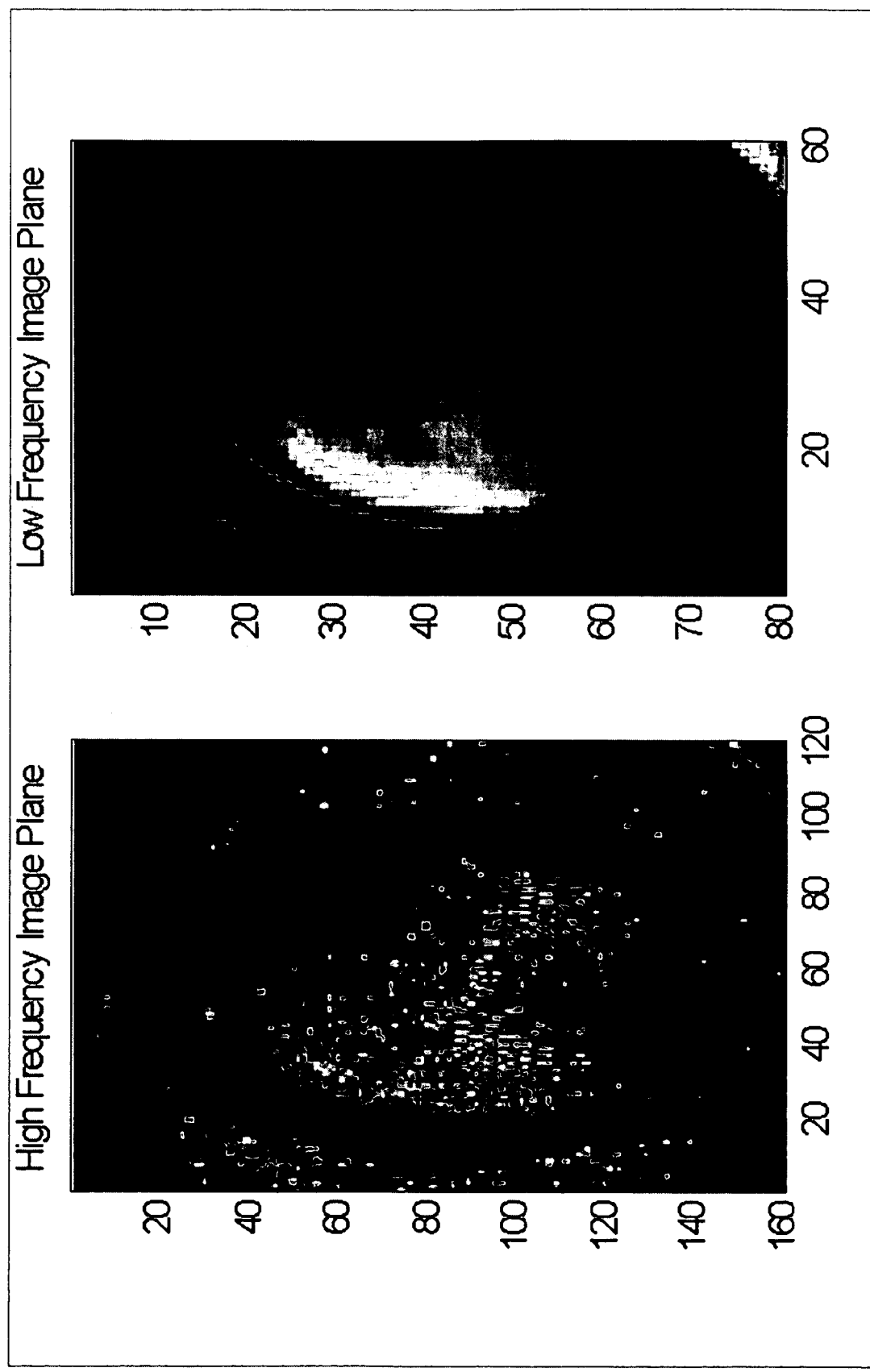
Fig. 7B Low Frequency Image Plane
Fig. 7A High Frequency Image Plane

BIOMETRICS WITH SPATIOSPECTRAL SPOOF DETECTION

CROSS REFERENCE TO RELATED APPLICATION

This application is related to concurrently filed, commonly assigned U.S. pat. appl. Ser. No. 11/461,244, entitled "SPATIAL-SPECTRAL FINGERPRINT SPOOF DETECTION," the entire disclosure of which is incorporated herein by reference for all purposes.

BACKGROUND OF THE INVENTION

This application relates generally to biometrics. More specifically, this application relates to fingerprint spoof detection.

"Biometrics" refers generally to the statistical analysis of characteristics of living bodies. One category of biometrics includes "biometric identification," which commonly operates under one of two modes to provide automatic identification of people or to verify purported identities of people. Biometric sensing technologies measure the physical features or behavioral characteristics of a person and compare those features to similar prerecorded measurements to determine whether there is a match. Physical features that are commonly used for biometric identification includes faces, irises, hand geometry, vein structure, and fingerprints. The last of these is the most prevalent of all biometric-identification features. Currently, methods for analyzing collected fingerprints include optical, capacitive, radio-frequency, thermal, ultrasonic, and several other less common techniques.

Biometric sensors, particularly fingerprint biometric sensors, are generally prone to being defeated by various forms of spoof samples. In the case of fingerprint readers, a variety of methods are known in the art for presenting readers with a fingerprint pattern of an authorized user that is embedded in some kind of inanimate material such as paper, gelatin, epoxy, latex, and the like. Thus, even if a fingerprint reader can be considered to reliably determine the presence or absence of a matching fingerprint pattern, it is also critical to the overall system security to ensure that the matching pattern is being acquired from a genuine, living finger, which may be difficult to ascertain with many common sensors.

There is accordingly a general need in the art for methods and systems that permit discrimination between legitimate and spoof presentations of fingerprints.

BRIEF SUMMARY OF THE INVENTION

Embodiments of the invention provide methods and systems that may be used in discriminating genuine skin sites presented in biometric applications from spoofs. In a first set of embodiments, methods are provided of deriving a discrimination feature set for use in identifying biometric spoofs. Each of a plurality of true skin sites is illuminated under a plurality of distinct optical conditions. First light reflected from each of the true skin sites is received. True-skin feature values are derived for each of a plurality of features from the received first light to characterize the true skin sites. Each of a plurality of biometric spoofs is similarly illuminated under the plurality of distinct optical conditions. Second light reflected from each of the biometric spoofs is received. Spoof feature values are derived for each of the plurality of features from the received second light to characterize the biometric spoofs. The derived true-skin feature values are compared with the derived spoof feature values to select a subset of the features to define the discrimination feature set.

Because the spectral and spatial frequency features or combinations of these features that uniquely distinguish a true skin image from a spoof image may not be readily apparent or identified by visual comparison of the features, some embodiments rely on discriminant-analysis techniques to first train a device to identify spatial and spectral features that are unique to true skin features and spatial and spectral frequency features that are unique to spoof features. A comparison is made of such features to new spectral and spatial frequency data at the time of attempted spoof detection. Discriminant-analysis methods that may be incorporated include those based on Mahalanobis distances, spectral residual magnitudes, K-nearest-neighbor methods, or linear or nonlinear discriminant techniques to compare spectral and spatial frequency data acquired from an individual with spatial and spectral frequency data present in a database.

In some embodiments, the true-skin feature values are derived by extracting a plurality of true-skin images from the received first light for each of the true skin sites, and the spoof feature values are derived by extracting a plurality of spoof images from the received second light for each of the biometric spoofs. Each of these true-skin images and each of these spoof images correspond to an image under one of the plurality of distinct optical conditions. Derivation of the true-skin feature values may further comprise a decomposition of the true-skin images into a plurality of different spectral frequency components, with the spoof feature values further being derived by decomposition of each of the spoof images into the plurality of different spectral frequency components.

Decomposition into spatial frequency components of each of the true-skin images and of the spoof images may sometimes comprise performing a wavelet decomposition. In addition, in some embodiments, a ratio of first of the different spatial frequency components for the true-skin images to a second of the different spatial frequency components for the true-skin images may be calculated. Similarly, a ratio of a first of the different spatial frequency components for the spoof images to a second of the different spatial frequency components for the spoof images may be calculated.

In certain embodiments, an intensity distribution is calculated for each of the different spatial frequency components for the true-skin images and for the spoof images. In such cases, at least one of the features may be substantially invariant to illumination intensity. An example of such an illumination-intensity invariant feature is a ratio of an intensity at a first predetermined percentile of an intensity distribution to a second predetermined percentile of the intensity distribution. In other cases, at least one of the features may vary with illumination intensity. An example of such an illumination intensity variant feature is a different between the intensity at the first determined percentile ad the intensity at the second predetermined percentile.

A number of different techniques may be used in different embodiments to compare the derived true-skin feature values with the derived spoof feature values. For example, in one embodiment, the true skin sites and the biometric spoofs define separate classes. The comparison includes calculating rations of within-class variance to between-class variance for a quantity derived from the features. In one instance, the quantity derived from the features comprises a Fisher linear discriminant transform of the features.

Selection of the subset of the features may also be performed with a variety of different techniques in different embodiments. Examples of such techniques include learning algorithms like genetic and other algorithms.

In a second set of embodiments, methods are provided of performing a biometric function on a purported skin site. The purported skin site is illuminated under a plurality of distinct optical conditions. Light scattered from the purported skin site is received. A feature value for each of a plurality of features is derived from the received light. A comparison is performed of the derived feature value for each of the plurality of features with reference feature values. Whether the purported skin site is a true skin site is accordingly determined from the comparison.

Specific techniques similar to those used in deriving the discrimination feature set may also be applied in deriving the feature value. For instance, a plurality of images may be extracted from the received light, with each of the images corresponding to an image under one of the plurality of distinct optical conditions. Each of the plurality of images may be decomposed into a plurality of different spatial frequency components. For instance, the decomposition may be achieved by performing a wavelet decomposition. In one embodiment, a ratio of a first of the different spatial frequency components to a second of the different spatial frequency components is also calculated. An intensity distribution may be calculated for each of the different spatial frequency components. In some cases, at least one of the features is substantially invariant to illumination intensity, such as for a feature that comprises a ratio of an intensity at a first predetermined percentile of the intensity distribution to an intensity at a second predetermined percentile of the intensity distribution. In other cases, at least one of the features varies with illumination intensity, such as for a feature that comprises a different between the intensity at the first predetermined percentile of the intensity distribution and the intensity at the second predetermined percentile of the intensity distribution.

In another embodiment, the purported skin site is illuminated under a plurality of distinct optical conditions. Light reflected from the purported skin site is received. The received light is used to perform a biometric identification as well as for determining whether the purported skin site is true skin or a spoof.

In cases where it is determined that the purported skin site is not a true skin site, an alarm maybe issued to identify the purported skin site as a spoof. In some embodiments, a biometric identification is also performed from the received light.

The methods of the invention may also be embodied on various types of apparatus. For instance, a computer-readable storage medium may be provided having a computer-readable program for directing operation of a computational device. The computational device includes a processor in communication with a storage device. The computer-readable program has instructions for implementing any of the methods described.

In other cases, a biometric sensor may be provided. The biometric sensor has an illumination subsystem, a detection subsystem, and a controller. The illumination subsystem is disposed to illuminate a purported skin site of an individual. The detection subsystem is disposed to receive light scattered from the purported skin site. The controller is in communication with the illumination subsystem and with the detection subsystem, and has instructions for implementing any of the methods described above.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, reference labels include a numerical portion followed by a latin-letter suffix; reference to only the numerical portion of reference labels is intended to refer collectively to all reference labels that have that numerical portion but different latin-letter suffices.

FIGS. 7A and 7B provide a comparison of high-frequency and low-frequency images of a fingerprint derived through decomposition of the multispectral datacube of FIG. 5;

DETAILED DESCRIPTION OF THE INVENTION

1. Introduction

Figure 1:
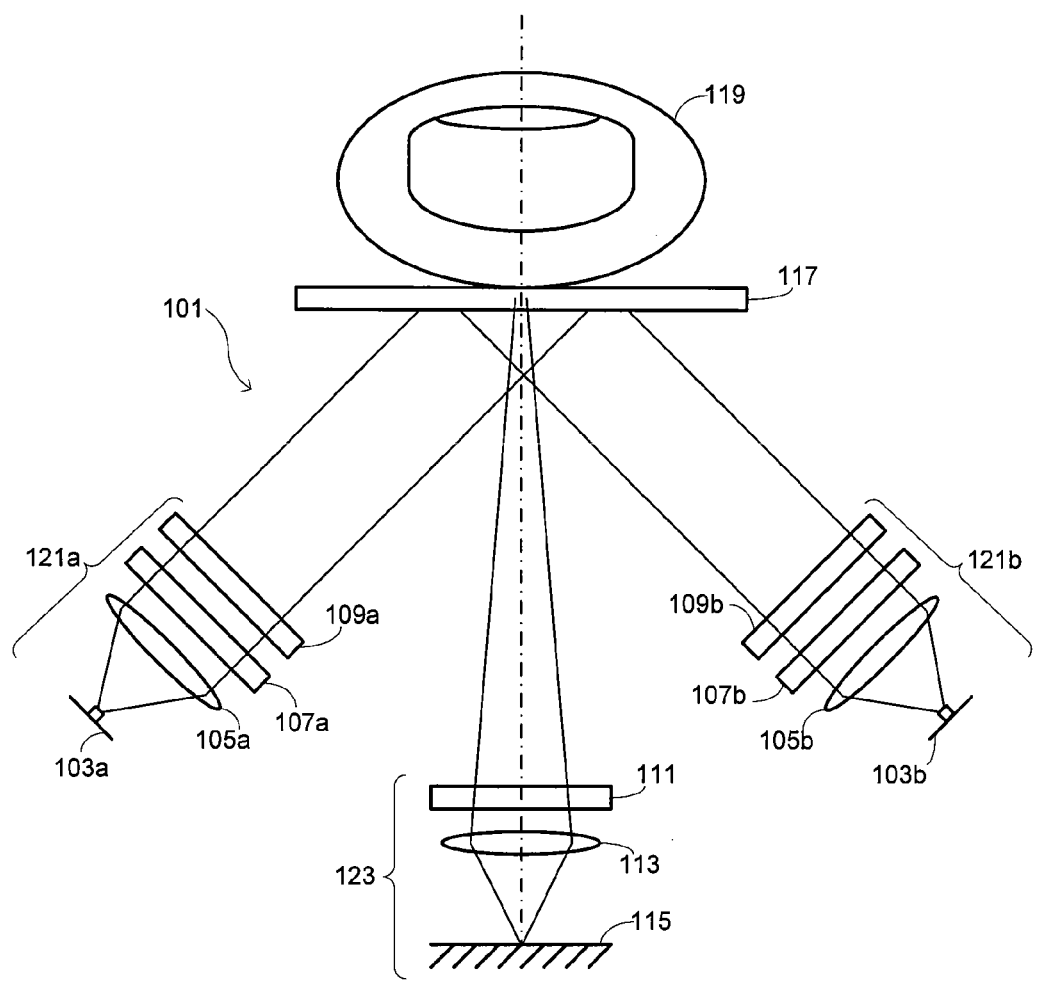
FIG. 1 provides a front view of a multispectral biometric sensor in one embodiment of the invention.

Embodiments of the invention provide methods and systems that may be used to discriminate between legitimate and spoof presentations of fingerprints. As used herein, the term "fingerprints" is intended to refer to any topographical skin feature, irrespective of whether it occurs on a finger or on another part of the body. It is generally expected that applications of the invention will find most utility when applied to topographical features present on the volar surfaces of fingers or hands, but the methods and systems described herein are not restricted to such skin locations and may be applied to other skin locations. Specific examples of skin sites from which "fingerprints" may be extracted thus include all surfaces and all joints of the fingers and thumbs, the fingernails and nail beds, the palms, the backs of the hands, the wrist and forearms, the face, the ears, areas around the eyes, and all other external surfaces of the body.

The ability to discriminate between legitimate and spoof presentations of fingerprints according to embodiments of the invention is based on differences in the combined spatial and spectral properties of living skin sites when compared with spoofs. In particular, skin is a complex organ made up of multiple layers, various mixtures of chemicals, and distinct structures such as hair follicles, sweat glands, and capillary beds. The outermost layer of skin, the epidermis, is supported by the underlying dermis and hypodermis. The epidermis itself may have five identified sublayers that include the stratum corneum, the stratum lucidum, the stratum granulosum, the stratum spinosum, and the stratum germinativum. Thus, for example, the skin below the top-most stratum corneum has some characteristics that relate to the surface topography, as well as some characteristics that change with depth into the skin. While the blood supply to skin exists in the dermal layer, the dermis has protrusions into the epidermis known as "dermal papillae," which bring the blood supply close to the surface via capillaries. In the volar surfaces of the fingers, this capillary structure follows the structure of the friction ridges on the surface. In other locations on the body, the structure of the capillary bed may be less ordered, but is still characteristic of the particular location and person. As well, the topography of the interface between the different layers of skin is quite complex and characteristic of the skin location and the person.

While spoofs may sometimes be made with considerable complexity, their structure of skin remains much more complex in both its spectral and spatial properties. In particular, spoofs have much simpler spectral properties and their spatial texture tends to be uniform with spectra. This may be contrasted with skin sites, which provide complex spectral properties in combination with a complex interplay between spatial texture and optical spectra, with nonuniformities existing in a spatial sense in addition to a spectral sense. These differences provide a basis for discrimination that may be embraced by the concept of "chromatic texture." This is an extension of the concept of "image texture," which refers generally to any of a large number of metrics that describe some aspect of a spatial distribution of tonal characteristics of an image. For example, some textures, such as those commonly found in fingerprint patterns or wood grain, are flow-like and may be well described by metrics such as an orientation and coherence. "Chromatic texture" extends this concept as a statistical distribution that is additionally a function of spectral frequency. Certain statistical moments such as mean, variance, skew, and kurtosis may be used in quantitative descriptions of texture. Chromatic texture may be manifested by variations in pixel intensities at different spectral frequencies across an image, which may be used in embodiments of the invention to identify spoofs in biometric applications.

2. Data Collection

Chromatic texture information may be acquired in embodiments of the invention by collecting an image of a purported skin site under multispectral conditions. As used herein, "multispectral" data refers to data that are collected during a single illumination session under a plurality of distinct optical conditions. The different optical conditions may include differences in polarization conditions, differences in illumination angle, differences in imaging angle, and differences in wavelength. One embodiment of a multispectral biometric sensor that may be used to collect multispectral data is shown in front view in FIG. 1. In this illustration, the multispectral sensor 101 comprises an illumination subsystem 121 having one or more light sources 103 and a detection subsystem 123 with an imager 115.

The figure depicts an embodiment in which the illumination subsystem 121 comprises a plurality of illumination subsystems 121a and 121b, but there is no limitation on the number of illumination or detection subsystems 121 or 123 that may be used. For example, the number of illumination subsystems 121 may conveniently be selected to achieve certain levels of illumination, to meet packaging requirements, and to meet other structural constraints of the multispectral biometric sensor 101. Illumination light passes from the source 103 through illumination optics 105 that shape the illumination to a desired form, such as in the form of flood light, light lines, light points, and the like. The illumination optics 105 are shown for convenience as consisting of a lens but may more generally include any combination of one or more lenses, one or more mirrors, and/or other optical elements. The illumination optics 105 may also comprise a scanner mechanism (not shown) to scan the illumination light in a specified one-dimensional or two-dimensional pattern. The light source 103 may comprise a point source, a line source, an area source, or may comprise a series of such sources in different embodiments. In one embodiment, the illumination light is provided as polarized light, such as by disposing a linear polarizer 107 through which the light passes before striking a finger 119 or other skin site of the person being studied.

In some instances, the light source 103 may comprise one or more quasimonochromatic sources in which the light is provided over a narrow wavelength band. Such quasimonochromatic sources may include devices such as light-emitting diodes, laser diodes, or quantum-dot lasers. Alternatively, the light source 103 may comprise a broadband source such as an incandescent bulb or glow bar. In the case of a broadband source, the illumination light may pass through a bandpass filter 109 to narrow the spectral width of the illumination light. In one embodiment, the bandpass filter 109 comprises one or more discrete optical bandpass filters. In another embodiment, the bandpass filter 109 comprises a continuously variable filter that moves rotationally or linearly (or with a combination of rotational and linear movement) to change the wavelength of illumination light. In still another embodiment, the bandpass filter 109 comprises a tunable filter element such as a liquid-crystal tunable filter, an acousto-optical tunable filter, a tunable Fabry-Perot filter or other filter mechanism known to one knowledgeable in the art.

After the light from the light source 103 passes through the illumination optics 105, and optionally the optical filter 109 and/or polarizer 107, it passes through a platen 117 and illuminates the finger 119 or other skin site. The sensor layout and components may advantageously be selected to minimize the specular reflection of the illumination into the detection optics 113. In one embodiment, such specular reflections are reduced by relatively orienting the illumination subsystem 121 and detection subsystem 123 such that the amount of directly reflected light detected is minimized. For instance, optical axes of the illumination subsystem 121 and the detection subsystem 123 may be placed at angles such that a mirror placed on the platen 117 does not reflect an appreciable amount of illumination light into the detection subsystem 123. In addition, the optical axes of the illumination and detection subsystems 121 and 123 may be placed at angles relative to the platen 117 such that the angular acceptance of both subsystems is less than the critical angle of the system; such a configuration avoids appreciable effects due to total internal reflectance between the platen 117 and the skin site 119.

An alternative mechanism for reducing the specular reflected light makes use of optical polarizers. Both linear and circular polarizers can be employed advantageously to make the optical measurement more sensitive to certain skin depths, as known to one familiar in the art. In the embodiment illustrated in FIG. 1, the illumination light is polarized by linear polarizer 107. The detection subsystem 123 may then also include a linear polarizer 111 that is arranged with its optical axis substantially orthogonal to the illumination polarizer 107. In this way, light from the sample must undergo multiple scattering events to significantly change its state of polarization. Such events occur when the light penetrates the surface of the skin and is scattered back to the detection subsystem 123 after many scatter events and it is only this light that finds its way to the detection system, the orthogonally polarized light from any specular reflection being rejected by the detection subsystem polarizer 111.

The detection subsystem 123 may incorporate detection optics that comprise lenses, mirrors, and/or other optical elements that form an image of the region near the platen surface 117 onto the detector 115. The detection optics 113 may also comprise a scanning mechanism (not shown) to relay portions of the platen region onto the detector 115 in sequence. In all cases, the detection subsystem 123 is configured to be sensitive to light that has penetrated the surface of the skin and undergone optical scattering within the skin and/or underlying tissue before exiting the skin.

The illumination subsystem 121 and detection subsystem 123 may be configured to operate in a variety of optical regimes and at a variety of wavelengths. One embodiment uses light sources 103 that emit light substantially in the region of 400-1000 nm; in this case, the detector 115 may be based on silicon detector elements or other detector material known to those of skill in the art as sensitive to light at such wavelengths. In another embodiment, the light sources 103 may emit radiation at wavelengths that include the near-infrared regime of 1.0-2.5 μm, in which case the detector 115 may comprise elements made from InGaAs, InSb, PbS, MCT, and other materials known to those of skill in the art as sensitive to light at such wavelengths.

The structure of the device illustrated in FIG. 1 is merely exemplary and a variety of other structures may be used in other embodiments to collect multispectral data. Some examples of alternative structures that may be used are described in the following copending, commonly assigned applications, the entire disclosure of each of which is incorporated herein by reference for all purposes: U.S. Prov. Pat. Appl. No. 60/483,281, entitled "HYPERSPECTRAL FINGERPRINT READER," filed Jun. 27, 2003; U.S. Prov. Pat. No. 60/504,594, entitled "HYPERSPECTRAL FINGERPRINTING," filed Sep. 18, 2003; U.S. Prov. Pat. No. 60/552,662, entitled "OPTICAL SKIN SENSOR FOR BIOMETRICS," filed Mar. 10, 2004; U.S. Pat. Appl. No. 10/576,364, entitled "MULTISPECTRAL FINGER RECOGNITION," filed Jun. 1, 2004 by Robert K. Rowe; 60/600,867, entitled "MULTISPECTRAL IMAGING BIOMETRIC," filed Aug. 11, 2004; U.S. Prov. Pat. Appl. No. 60/610,802, entitled "FINGERPRINT SPOOF DETECTION USING MULTISPECTRAL IMAGING," filed Sep. 17, 2004; U.S. Prov. Pat. Appl. No. 60/654,354, entitled "SYSTEMS AND METHODS FOR MULTISPECTRAL FINGERPRINT SENSING," filed Feb. 18, 2005; U.S. Prov. Pat. Appl. No. 60/659,024, entitled "MULTISPECTRAL IMAGING OF THE FINGER FOR BIOMETRICS," filed Mar. 4, 2005; U.S. Prov. Pat. Appl. No. 60/675,776, entitled "MULTISPECTRAL BIOMETRIC SENSORS," filed Apr. 27, 2005; U.S. patent application Ser. No. 10/818,698, entitled "MULTISPECTRAL BIOMETRIC SENSOR," filed Apr. 5, 2004 by Robert K. Rowe et al.; U.S. Pat. Appl. No. 11/437,388, entitled "MULTISPECTRAL BIOMETRIC SENSOR," filed May 18, 2006 by Robert K. Rowe et al; U.S. patent application Ser. No. 11/383,901, entitled "BIOMETRIC SENSOR," filed May 17, 2006 by Robert K. Rowe et al; U.S. patent application Ser. No. 11/177,817, entitled "LIVENESS SENSOR," filed Jul. 8, 2005 by Robert K. Rowe; U.S. patent application Ser. No. 11/115,100, entitled "MULTISPECTRAL IMAGING BIOMETRICS," filed Apr. 25, 2005; U.S. patent application Ser. No. 11/115,101, entitled "MULTISPECTRAL BIOMETRIC IMAGING," filed Apr. 25, 2005; U.S. patent application Ser. No. 11/115,075, entitled "MULTISPECTRAL LIVENESS DETERMINATION," filed Apr. 25, 2005; U.S. patent application Ser. No. 11/015,732, entitled "COMBINED TOTAL-INTERNAL-REFLECTANCE AND TISSUE IMAGING SYSTEMS AND METHODS," filed Dec. 17, 2004 by Robert K. Rowe; U.S. patent application Ser. No. 11/379,945, entitled "MULTISPECTRAL BIOMETRIC SENSORS," filed Apr. 24, 2006 by Robert K. Rowe; and U.S. patent application Ser. No. 11/219,006, entitled "COMPARATIVE TEXTURE ANALYSIS OF TISSUE FOR BIOMETRIC SPOOF DETECTION," filed Sep. 1, 2005 by Robert K. Rowe.

Furthermore, a multispectral biometric sensor like that illustrated in FIG. 1 or as described in other applications may be used in embodiments of the invention in combination with other types of biometric sensors. For example, a configuration might use thermal, ultrasonic, radio-frequency, or other mechanism to collect information defining a fingerprint pattern of a purported skin site for comparison with a database, while simultaneously collecting multispectral data to aid in spoof detection. In other embodiments, the multispectral biometric sensor is advantageously used to collect a set of multispectral data that are used in both biometric identification and in spoof detection.

Figure 2:
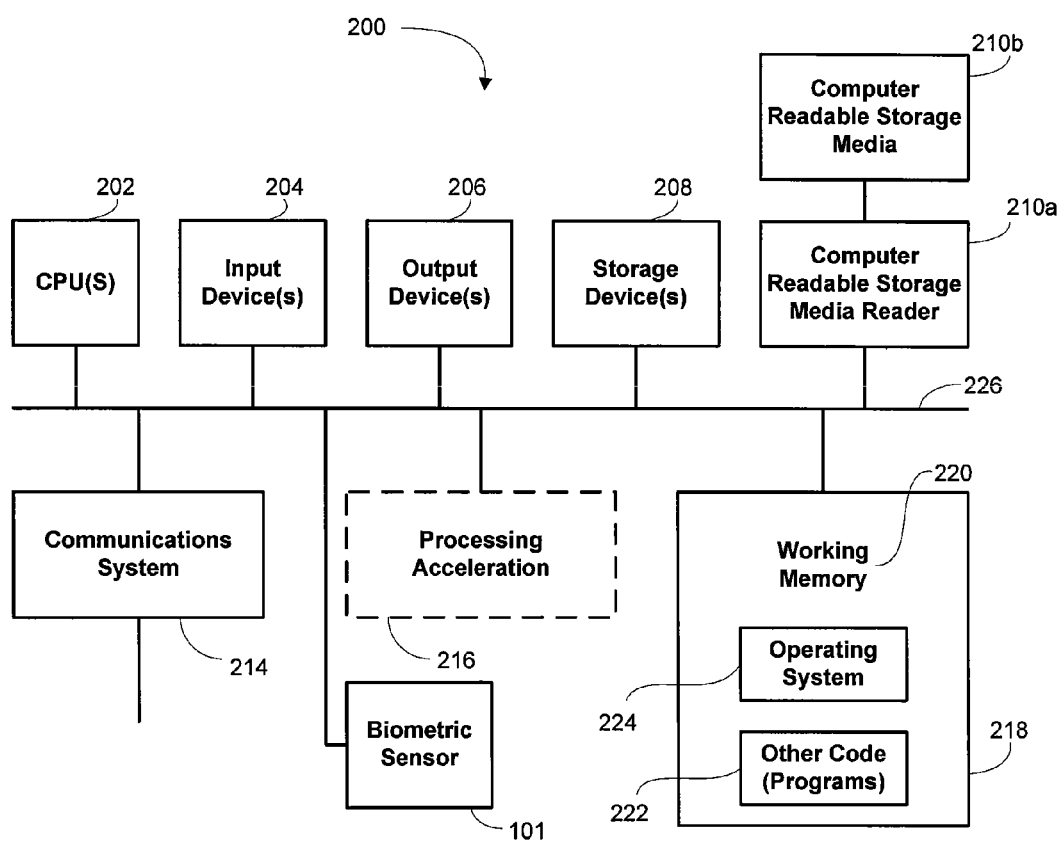
FIG. 2 provides a schematic representation of a computer system that may be used to manage functionality of the multispectral biometric sensor illustrated in FIG. 1 and/or to implement various methods of the invention.

Operation of the multispectral sensor may be coordinated with a computational system like that shown schematically in FIG. 2. The drawing broadly illustrates how individual system elements may be implemented in a separated or more integrated manner. The computational device 200 is shown comprised of hardware elements that are electrically coupled via bus 226, which is also coupled with the multispectral biometric sensor 101. The hardware elements include a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged with external devices.

The computational device 200 also comprises software elements, shown as being currently located within working memory 220, including an operating system 224 and other code 222, such as a program designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

3. Data Analysis

Figure 3A:
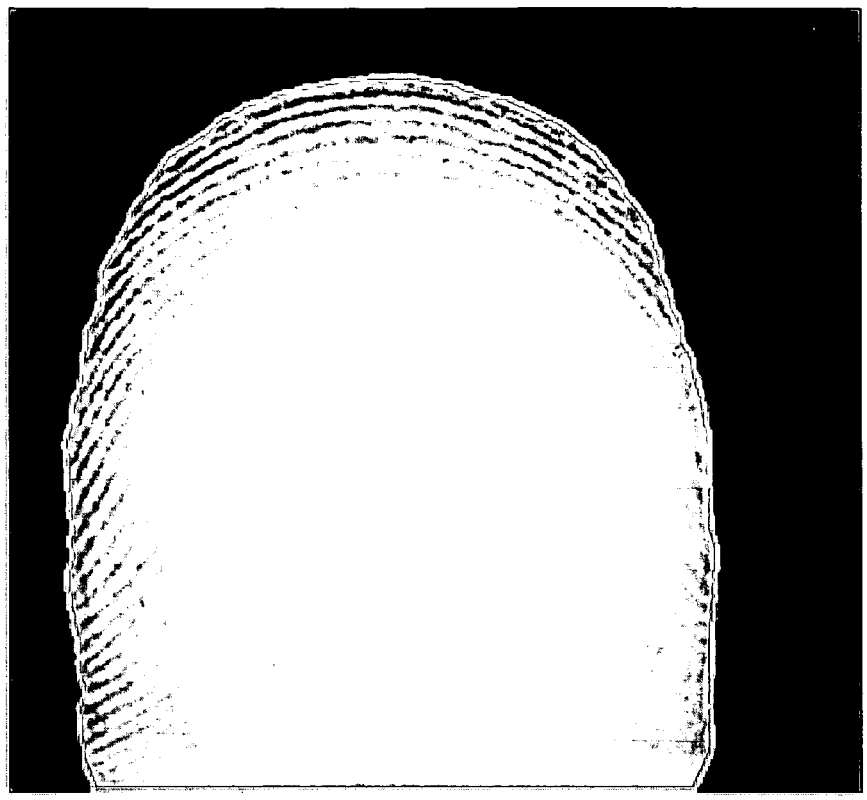
FIGS. 3A and 3B provide a comparison of fingerprint measurements made from a living finger and made from a prosthetic that acts as a nonliving spoof.
Figure 3B:

The potential for spoofs to be effective in circumventing conventional biometric analyses is illustrated with FIGS. 3A and 3B, which show fingerprint images taken from a finger and from a spoof respectively. The spoof that provided the image in FIG. 3B was an ultrarealistic prosthetic fingertip whose construction was commissioned by the inventors. The prosthetic fingertip was made of a multilayer silicone structure, cast on a real and available finger, and colored to match the coloring of the real finger. Fine detail was included on the prosthetic, including the fine detail of fingerprints. It is apparent from the images in FIGS. 3A and 3B that it is difficult to discern which image was collected from a real finger and which was collected with a spoof.

a Identification of Discrimination Features

Figure 4:
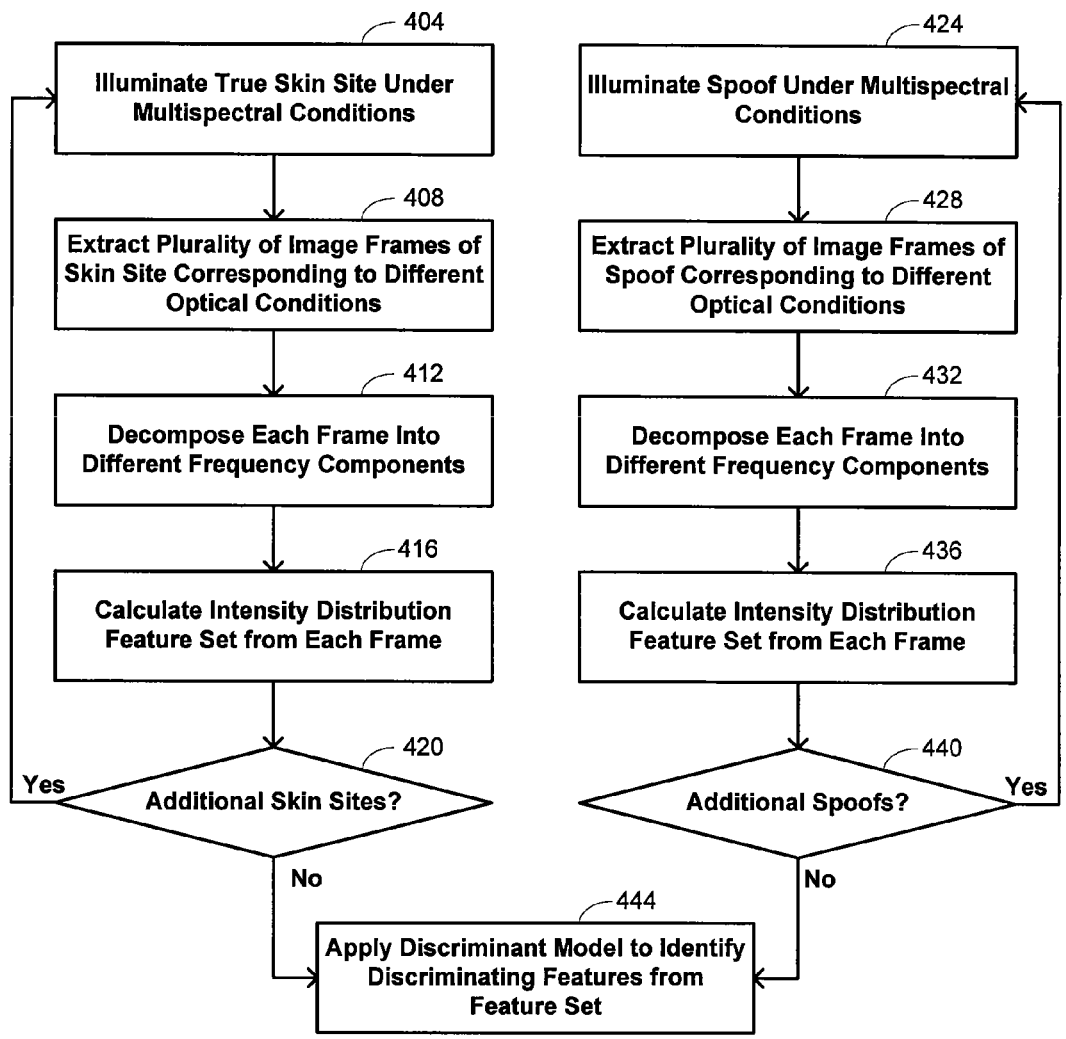
FIG. 4 is a flow diagram summarizing methods for identifying features for discriminating between legitimate and spoof presentations of fingerprints.

FIG. 4 provides a flow diagram that summarizes methods for identifying features that may be used as discriminants in identifying spoofs. Generally, after the identification of suitable discriminants, analysis of purported skin sites may be performed by a suitable comparison of features with the discriminants.

The method begins at block 404 with the illumination of a true skin site under multispectral conditions, as may be performed using a multispectral biometric sensor like that described above. The collected data may be considered to define a multispectral dataset that permits extraction of information along a number of independent variables. The multispectral dataset is sometimes referred to as a "multispectral datacube," but this terminology is not intended to suggest any particular limit on the number of independent variables embraced by the dataset; the number of independent variables depends on the number of different factors used in generating the different optical conditions defining the multispectral conditions under which data are collected and may vary among different embodiments.

Figure 5:
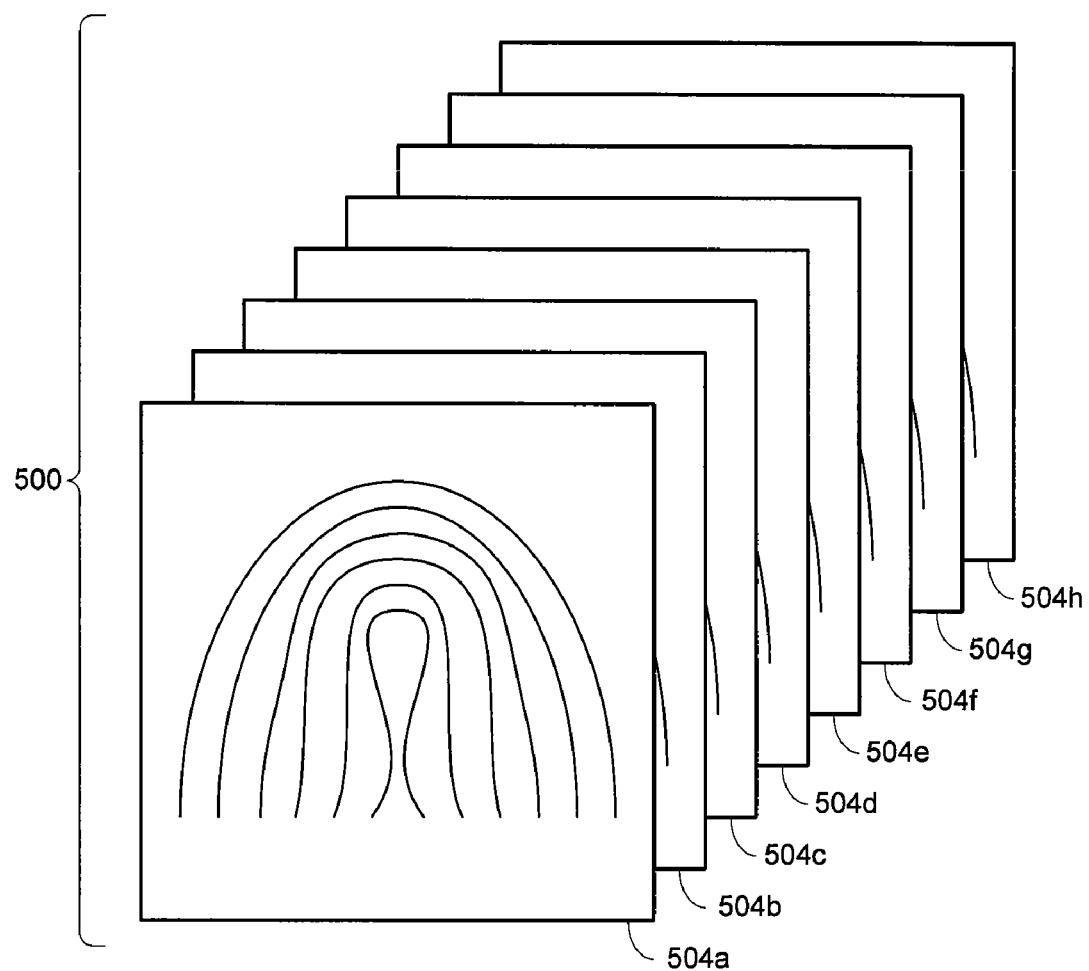
FIG. 5 illustrates a multispectral datacube derived from data collected with a multispectral biometric sensor like that illustrated in FIG. 1.

As indicated at block 408, a plurality of image frames are extracted from the multispectral datacube to correspond to different optical conditions. This is illustrated schematically in FIG. 5, in which a multispectral datacube has been used to extract an image set 500 that consists of eight images 504. The number of images extracted may vary in different embodiments. Merely by way of example, the eight images 504 might correspond to images under two different polarization conditions—unpolarized and cross-polarized conditions—for each of four different illumination wavelengths. In other instances, the different images might correspond to different illumination angles, different imaging angles, and/or any other differences in optical conditions.

Figure 6:
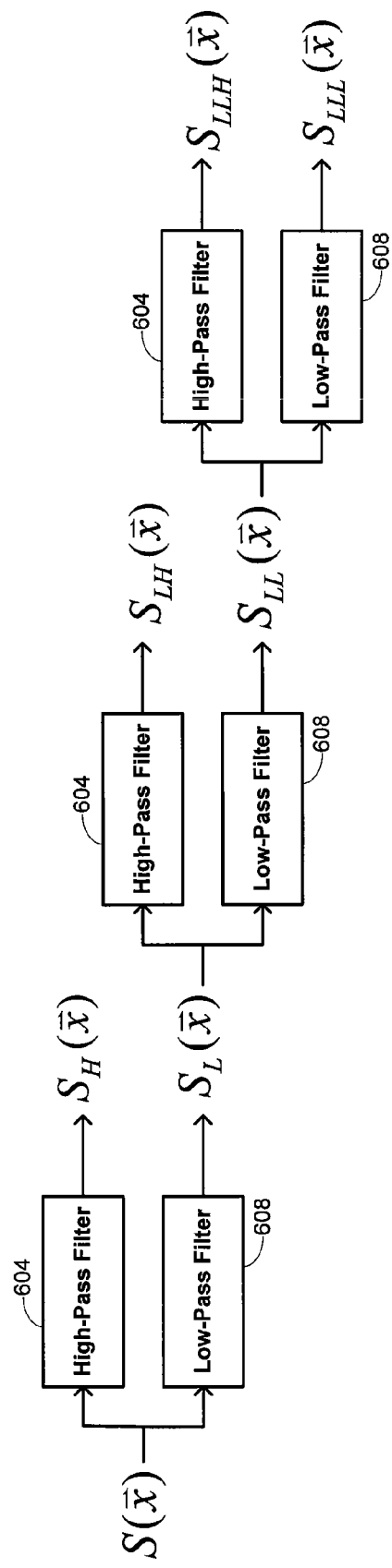
FIG. 6 provides an illustration of a wavelet decomposition obtained by application of high-pass and low-pass filters to an image.

Each of the image frames is decomposed into different spatial frequency components at block 412. There are a number of different ways in which such a decomposition may be accomplished in different embodiments. In certain embodiments, a wavelet transform is applied to each of the image frames. This may be done in embodiments that use a discrete wavelet transform by applying high-pass and low-pass filters to the image frames as illustrated in FIG. 6 according to a Mallet-tree decomposition. In this type of decomposition, an initial image frame $S(\vec{x})$ is subjected to the high-pass filter 604 to produce $S_H(\vec{x})$ and is subject to the low-pass filter 608 to produce $S_L(\vec{x})$. Successive decompositions, if desired, are applied to the output of the low-pass filter 608. Thus, a second level of decompositions is applied to $S_L(\vec{x})$ to produce $S_{LH}(\vec{x})$ and $S_{LL}(\vec{x})$. This may be repeated for as many levels of decomposition as desired, with an nth level of decomposition resulting in the generation of (n+1) signals.

At each decomposition level, the filters produce signals that span a portion of the original frequency range. In the illustration of FIG. 6, three levels of decomposition result in the generation of four signals, with $S_H(\vec{x})$ representing a high-frequency signal, $S_{LH}(\vec{x})$ representing a medium-frequency signal, $S_{LLH}(\vec{x})$ representing a low-frequency signal, and $S_{LLL}(\vec{x})$ representing a very-low-frequency signal. A comparison is provided in FIGS. 7A and 7B of signals in different frequency regions to illustrate the different types of information available at those frequencies, with FIG. 7A providing a high-frequency image and FIG. 7B providing a low-frequency image. The results of FIGS. 7A and 7B were derived from the same original image.

The particular form of the high-pass and low-pass filters 604 and 608 may vary in different embodiments. For example, in one embodiment where Haar transforms are implemented, the high-pass filter 604 effectively acts to determine a difference between adjacent pixels of the input image while the low-pass filter 608 effectively acts to determine an average between adjacent pixels. Other examples of transforms that may be implemented with discrete wavelets, and which are well-known to those of skill in the art, include Daubechies transforms, Coiflet transforms, Symlet transforms, Meyer transforms, Morlet transforms, and mexican-hat transforms, among others. The implementation of these and other transforms are also within the scope of the invention.

In particular embodiments, the frequency decomposition performed at block 412 is performed with a dual-tree complex wavelet transform, details of which are provided in Nick Kingsbury, "Complex Wavelets for Shift Invariant Analysis and Filtering of Signals," J. Appl. Comp. Harmonic Analysis, 10, 234 (2001), the entire disclosure of which is incorporated herein by reference for all purposes. Briefly, the extension of wavelet analysis to a complex domain increases the dimensionality of the analysis. Instead of outputting two images by the application of filters, each level of decomposition produces four images equal in size to the input image for that level, with the lowest-frequency image becoming the input for the next level. Each of the images is constructed using different row and column filters, so that the output images are themselves provided in the form of four component images, each of which is one quarter the size of the input image. In each instance, the four component images are encoded in pixel quads. This technique advantageously has the property that it is relatively spatially invariant, particularly in comparison with a variety of other types of techniques.

Other examples of techniques that may be used to effect the frequency decomposition in different embodiments include the use of moving-window Fourier transforms and the application of Gabor filters, among a variety of different techniques known to those of skill in the art.

Returning to FIG. 4, the decomposed images may then each be used to calculate an intensity-distribution feature set. Generally, elements of the intensity-distribution feature set include scalar values that quantify some aspect of each of the decomposed images. In certain embodiments, this is accomplished through the construction of integral histograms from each of the decomposed images, with the scalar values being determined from relationships between different points in the integral histogram.

Figure 8A:
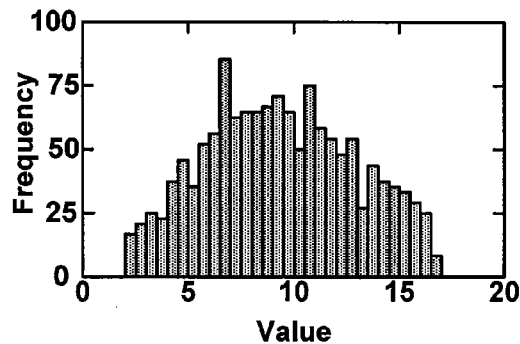
FIGS. 8A and 8B illustrate differences between conventional and integral histograms.
Figure 8B:
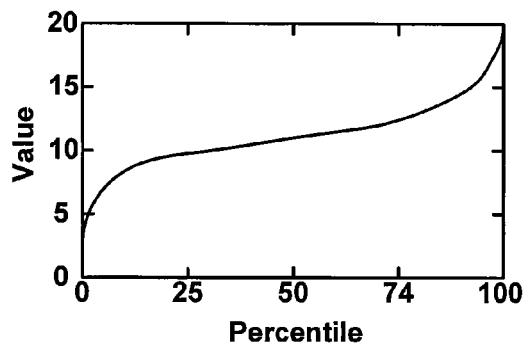

FIGS. 8A and 8B provide an illustration of the differences between classical histograms and integral histograms. While a classical histogram like that shown in FIG. 8A provides the frequency with which a variable appears between two defined values, an integral histogram like that shown in FIG. 8B provides the value at any percentile of the distribution. Information characterizing a distribution may generally be presented in either form; but for the applications described herein, an integral distribution has the advantage that the ratio of any two percentile values is substantially constant with respect to gain-like variables that multiply all values uniformly. One example of such a gain-like variable is the illumination intensity in the multispectral biometric system. This renders scalar feature-set variables that take the form of ratios of percentile values substantially invariant to illumination intensity.

In addition to scalar features that are ratios of percentile values, other arithmetic combinations of percentile values may be used as scalar features. These other arithmetic combinations may in some instances not be invariant to illumination intensity, but may nonetheless sometimes provide valuable discriminant information. Merely by way of example, one scalar feature that may be determined for each of the decomposed images is the ratio of the intensity of the image at percentile 0.30 to the intensity of the image at percentile 0.70. Another scalar feature that may be determined is the sum of the intensity of the image at percentile 0.30 with the intensity of the image at percentile 0.70. The use of 0.30 and 0.70 percentiles in these examples is made purely for illustrative purposes. In other instances, different percentile values may be used. Also, the invention is not limited by the number of scalar features derived from each of the images. In some instances, only a single feature might be derived from each image, while other embodiments may derive a plurality of features. Furthermore, it is not necessary that scalar features be derived from every image that results from the decomposition. In some embodiments, scalar features are extracted from a subset of the decomposed images. Also, while the example discussed herein make use of scalar features, it is possible in alternative embodiments to define features that have a multidimensional quality, or to combine the scalar features into a multidimensional vector.

The method embraced by blocks 404-416 of FIG. 4 may be repeated for multiple skin sites, with block 420 of the drawing indicating that the method loops until all skin sites of a set have been processed in this way.

A similar procedure may be applied to multiple spoofs, with the various spoofs preferably having diverse characteristics representative of the types of spoofs that might be attempted. The same basic methodology is applied to the spoofs as was applied to the skin sites. At block 424, a particular spoof is illuminated under multispectral conditions. These multispectral conditions may be substantially the same multispectral conditions under which the true skin sites were illuminated at block 404. A plurality of image frames of the spoof that correspond to different optical conditions are extracted from the resulting datacube at block 428. Each of the image frames is decomposed into different frequency components at block 432 and an intensity distribution feature set is calculated from each frame at block 436. These steps may be performed using the same techniques applied to the true skin sites, and may be performed for a number of different spoofs as indicated with the check performed at block 440.

After feature sets have been generated from both skin sites and from spoofs, a discriminant model is applied at block 444 to determine discriminating features from the feature sets. There are a number of different types of discriminant models that may be applied in different embodiments. Certain embodiments make use of the recognition by the inventors that, on average, spoof and true skin sites will have different intensity distributions. This is a consequence of the different structural characteristics that distinguish living tissue and are manifested in both spectral and spatial variations. For any particular feature, the variance between spoof classes and a true skin-site class is expected to be small relative to the within-class variances. Thus, one measure of the discriminating power of the derived features is the ratio of within-class variance to between-class variance. In certain embodiments, this ratio is thus calculated directly when applying the discriminant model at block 444.

For example, applying steps 404-416 for a particular true skin site may provide a number of feature values $t_1^{(1)}$, $t_2^{(1)}, \ldots, t_N^{1}$ where N is the number of features. Representing this set of feature values as an N-dimensional vector $\vec{t}^{(1)}$, the set of features for all the measurements on true skin sites may be represented by the set of vectors $\vec{t}^{(1)}, \vec{t}^{(2)}, \ldots, \vec{t}^{(M_t)}$, where $M_t$ is the number of multispectral measurements performed on true skin sites. Similarly, the set of features for all the measurements on spoofs may be represented by the set of N-dimensional vectors $\vec{s}^{(1)}, \vec{s}^{(2)}, \vec{s}^{(M_s)}$, where $M_s$ is the number of multispectral measurements on spoofs. For this set of feature values, the mean of the true-skin-site feature values is $$\vec{\mu}_t = \frac{1}{M_t} \sum_{k=1}^{M_t} \vec{t}^{(k)},$$

the mean of the spoof feature values is $$\vec{\mu}_s = \frac{1}{M_s} \sum_{k=1}^{M_s} \vec{s}^{(k)},$$

and the mean of the entire set of feature values is $$\vec{\mu} = \frac{1}{M_t + M_s} \left( \sum_{k=1}^{M_t} \vec{t}^{(k)} + \sum_{k=1}^{M_s} \vec{s}^{(k)} \right).$$

The within-class variance is $$\sigma_{WC}^{(j)2} = \frac{1}{M_t + M_s} \left( \sum_{k=1}^{M_t} (\mu_t^{(j)} - t_j^{(k)})^2 + \sum_{k=1}^{M_t} (\mu_s^{(j)} - s_j^{(k)})^2 \right)$$

and the between-class variance is $$\sigma_{BC}^{(j)2} = \frac{1}{M_t + M_s} \left( \sum_{k=1}^{M_t} (\mu^{(j)} - t_j^{(k)})^2 + \sum_{k=1}^{M_t} (\mu^{(j)} - s_j^{(k)})^2 \right),$$

permitting calculation of the ratio as $$R = \frac{\sigma_{WC}^{(j)2}}{\sigma_{BC}^{(j)2}}$$

for each feature j.

In other embodiments, a Fisher linear discriminant may be applied to transform the raw derived features into a new set of features. This is accomplished by applying a transform T to the feature sets $\vec{t}$ and $\vec{s}$ to produce new feature sets $$\vec{t}' = T\vec{t} \text{ and } \vec{s}' = T\vec{s}.$$

The transform is an N×N matrix that may be expressed as T= [$\vec{e}_1, \vec{e}_2, \ldots \vec{e}_N$], where the set of $\vec{e}$ vectors are generalized eigenvectors of the between-class and within-class scattering matrices $$S_{BC} = M_t(\vec{\mu}_t - \vec{\mu})(\vec{\mu}_t - \vec{\mu})^T + M_s(\vec{\mu}_s - \vec{\mu})(\vec{\mu}_s - \vec{\mu})^T$$

$$S_{WC} = \sum_{k=1}^{M_t} (\vec{t}^{(k)} - \vec{\mu}_t)(\vec{t}^{(k)} - \vec{\mu}_t)^T + \sum_{k=1}^{M_s} (\vec{s}^{(k)} - \vec{\mu}_s)(\vec{s}^{(k)} - \vec{\mu}_s)^T.$$

The same type of calculation as described above for the raw feature values may be performed with the transformed feature values to calculate a ratio of the within-class variance to the between-class variance. This transform advantageously maximizes such a ratio, thereby enhancing the discrimination power of the discriminant model.

In many instances, it is expected that a subset of the features or transformed features will be sufficient to provide discrimination between true skin samples and spoofs. Part of applying the discriminant model at block 444 may thus include making a selection of a subset of the features or transformed features having sufficient discriminatory power, in some instances being those features that provide the best discriminatory power. There are a number of techniques that may be used in different embodiments for selection of the subset of features, including the use of genetic algorithms, neural networks, expert systems, simulated annealing, and any of a variety of artificial-intelligence techniques that may permit identification of those features having the desired discriminatory power. Such techniques are sometimes referred to collectively herein as "learning algorithms."

The application of such techniques is generally well known to those of skill in this art. For example, a genetic algorithm functions by creating a population of feature sets, with each set being a subset of the total available features. The spoof-detection performance of each member of the population is determined. The best-performing members are selected and a new population generated by splitting and combining the feature sets of the best performers. This process is repeated until performance stops improving, with the resultant population defining the desired feature sets. Such a method is described as "genetic" in analogy to biological systems. The splitting and combining of feature sets is analogous to biological reproduction of cells and the selection of the best performing members is analogous to biological selection in reproductive processes.

EXAMPLE

The method of FIG. 4 has been applied by the inventors to evaluate the ability of the method to provide good discrimination between spoofs and true skin sites. In this example, spoofs and true skin sites were illuminated under multispectral conditions, with images being acquired at four distinct wavelengths and under two polarization conditions, a cross-polarized configuration and a nonpolarized configuration. There were thus eight images acquired for each skin site and for each spoof. Each of these eight images was decomposed into three subimages using a dual-tree complex wavelet transform as described above, the three images corresponding to high, medium, and low frequency components. In addition, fourth subimage was generated for each of the images as a ratio of the medium-frequency image to the low-frequency image. Each of the resulting 32 subimages was subjected to an integral-histogram analysis in which two scalar features were extracted, one as the sum of the intensity of the subimage at a 0.30 percentile with the intensity at a 0.70 percentile and the other as the ratio of the 0.30-percentile intensity to the 0.70-percentile intensity. As previously noted, the second of these is a globally illumination-invariant feature while the first of these is not.

Figure 9:
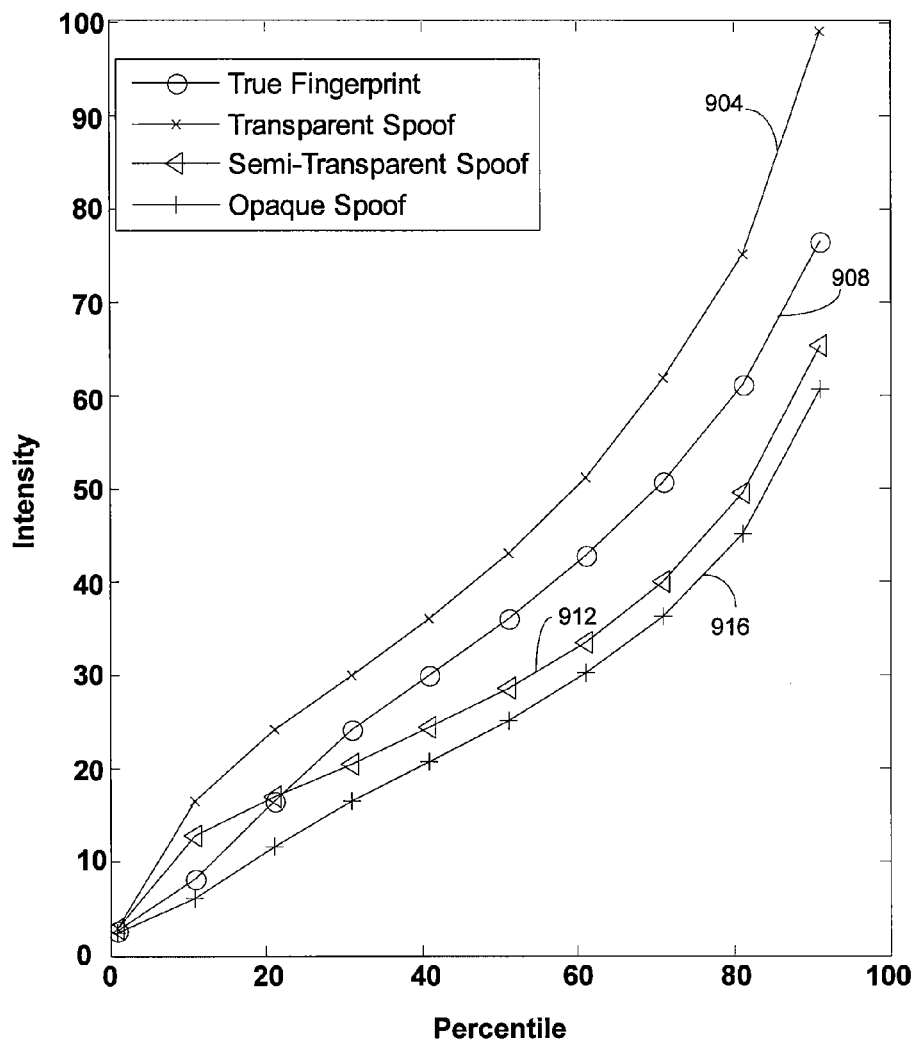
FIG. 9 provides an integral histogram for low-frequency images derived from a decomposition of the multispectral datacube of FIG. 5 in one embodiment.
Figure 10:
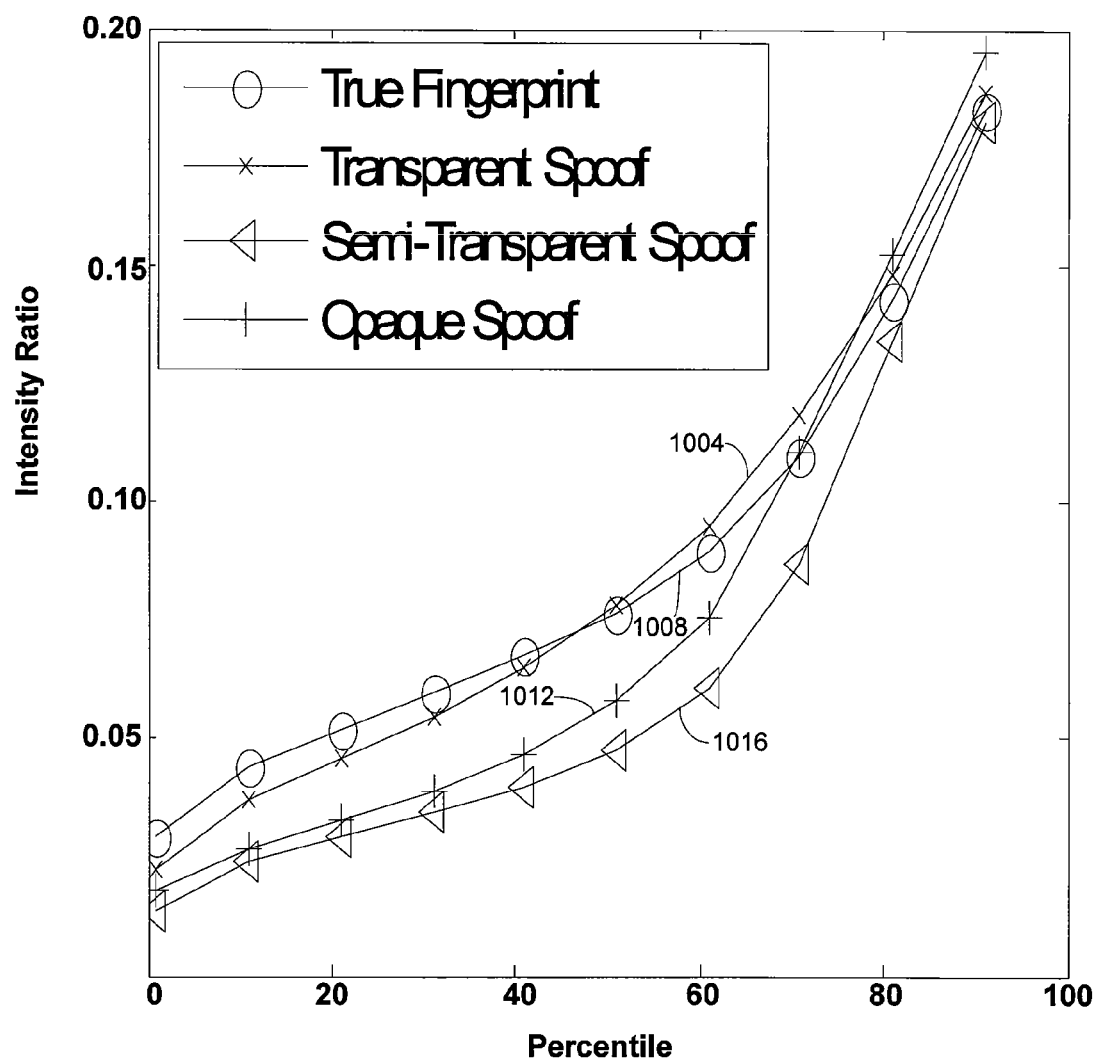
FIG. 10 provides an integral histogram for a ratio of low-frequency to high-frequency images derived from a decomposition of the multispectral datacube of FIG. 5 in one embodiment.

FIG. 9 shows the integral histogram from one of the subimages, in this instance the medium-frequency image plane. The results for a true skin site are shown with curve 908, which permits comparison with results for three different types of spoof: a transparent spoof shown with curve 904, a semitransparent spoof shown with curve 912, and an opaque spoof shown with curve 916. While there are clearly some differences in the results, a significant portion of this difference is a consequence of the different levels of transparency of the true skin site and different spoofs. The results of FIG. 10 show haw this effect is mitigated by presenting an integral histogram of the ratio of the medium-frequency image plane to the low-frequency image plane. This provides local insensitivity to illumination intensity. In that case, genuine differences may be discerned between the results of the true skin site along curve 1008 and the transparent spoof along curve 1012, the semitransparent spoof along curve 1016, and the opaque spoof along curve 1004.

This calculation of two scalar features from each of the 32 subimages provides a total of 64 scalar features that may be subjected to a discriminant model. In this instance, the 64 scalar features were organized into eight groups, each of which has eight members to correspond to the eight image planes extracted from the multispectral data. This grouping is illustrated in Table I. In this table, "P30" refers to the intensity at the 0.30 percentile and "P70" refers to the intensity of the 0.70 percentile.

TABLE I

| Feature Numbers | Elements |
|---|---|
| 1-8 | P30/P70 for medium-frequency/low-frequency ratio |
| 9-16 | P30 + P70 for medium-frequency/low-frequency ratio |
| 17-24 | P30/P70 for high frequency |
| 25-32 | P30 + P70 for high frequency |
| 33-40 | P30/P70 for medium frequency |
| 41-48 | P30 + P70 for medium frequency |
| 49-56 | P30/P70 for low frequency |
| 57-64 | P30 + P70 for low frequency |

Figure 11:
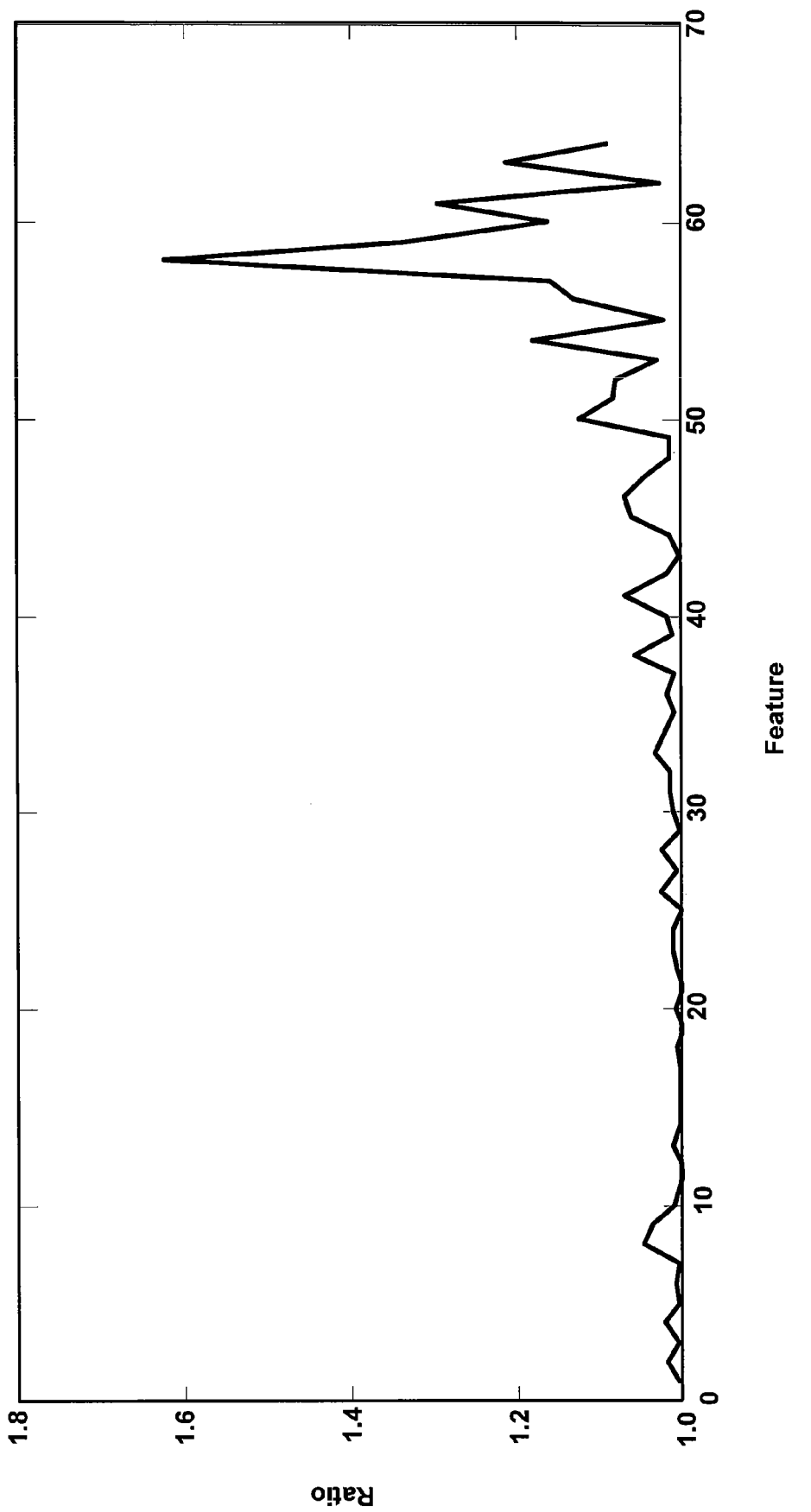
FIG. 11 provides a ratio of between-class variance to in-class variance for a number of different features derived from a decomposition of the multispectral datacube of FIG. 5 in one embodiment.
Figure 12:
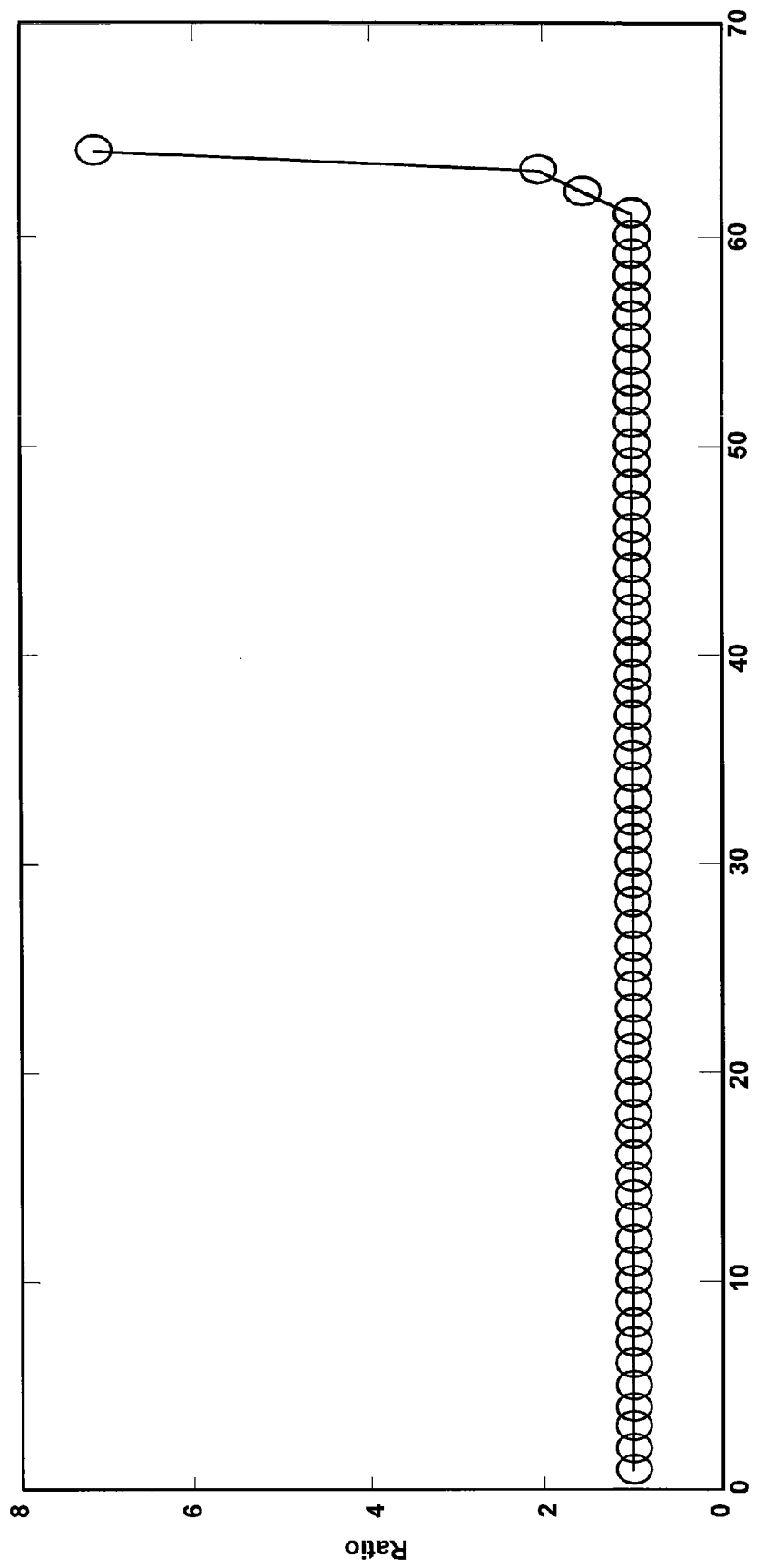
FIG. 12 provides a ratio of between-class variance to in-class variance for a number of different features derived from application of a Fisher linear discriminant to a decomposition of the multispectral datacube of FIG. 5 in one embodiment.

The ratio of within-class to between-class variance for these raw features is shown in the results of FIG. 11. Ratios close to unity are indicative of relatively poor discrimination power, and higher ratios indicate better discrimination power. These results show that discrimination power is spread broadly over the features, although the lower-frequency features at the higher feature numbers re generally better. FIG. 12 shows that the discrimination power can be concentrated more effectively in a smaller number of features by application of the Fisher linear discriminant. FIG. 12 shows the ratio of the within-class variance to between-class variance for the Fisher-transformed features.

In this instance, discrimination power is ever more concentrated in just a few features. Indeed, after transformation, the vast majority of the features have little discrimination power, which is instead concentrated in the last three features. This suggests that discrimination between a true skin site and a spoof may be accomplished using only three transformed features.

Figure 13:
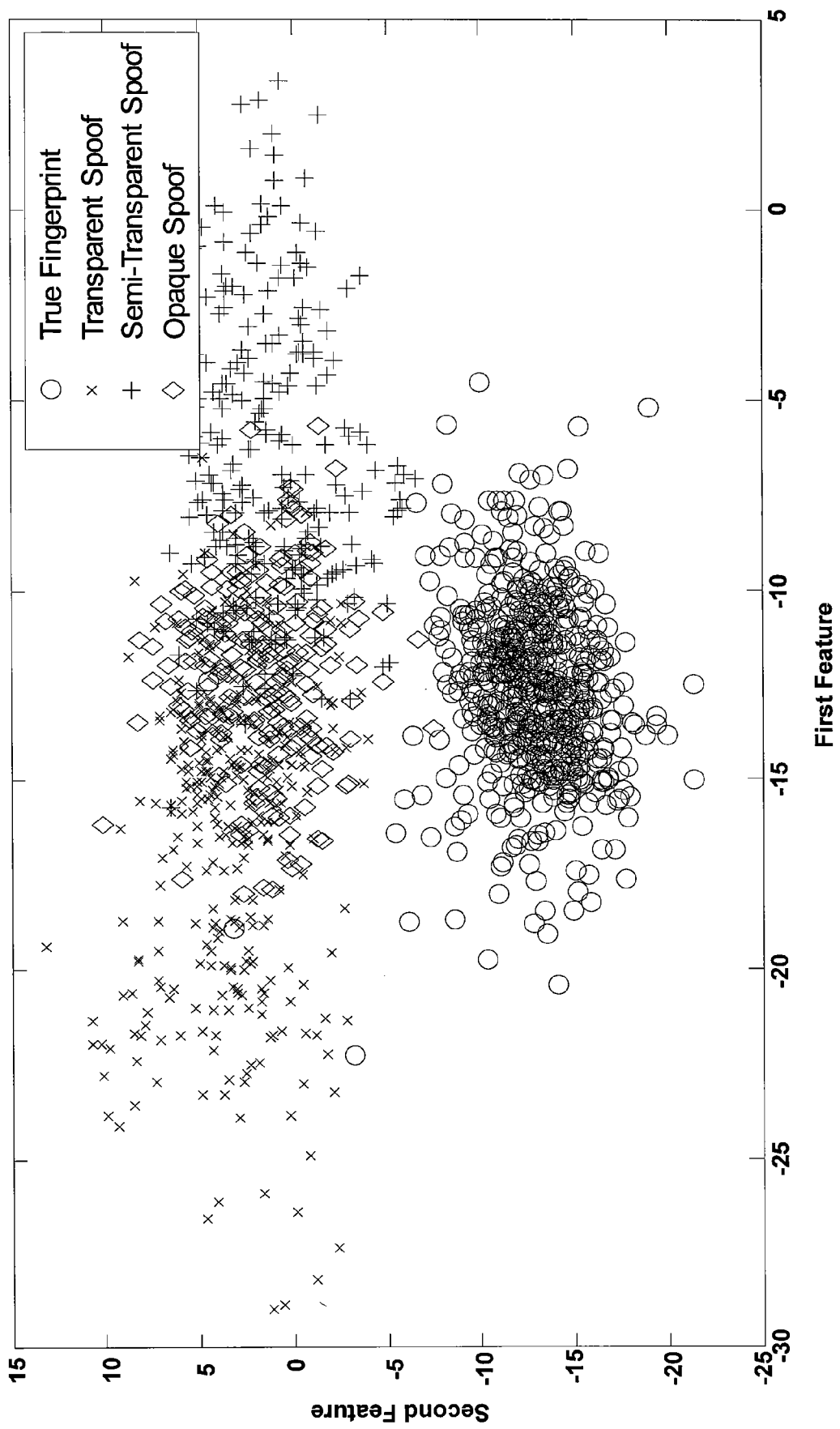
FIG. 13 is a scatter plot illustrating the ability of two Fisher features derived in accordance with an embodiment of the invention to discriminate between legitimate and spoof presentations of fingerprints.

In fact, even just two of the transformed features prove to be sufficient. This is illustrated in FIG. 13, which provides a scatter plot to show the position of the transformed features in a two-dimensional space spanned by values of the two most significant features. Results for true skin sites are shown with circles, while results for different types of spoof are shown with different symbols. It is evident that while these two features alone might not provide good discrimination among the different types of spoof, they show excellent discrimination between spoofs and true skin sites. The results for the spoof are clustered in one area of the space and the results for the true skin sites are clustered in a different area of the space.

b. Classification of Measurements

Figure 14:
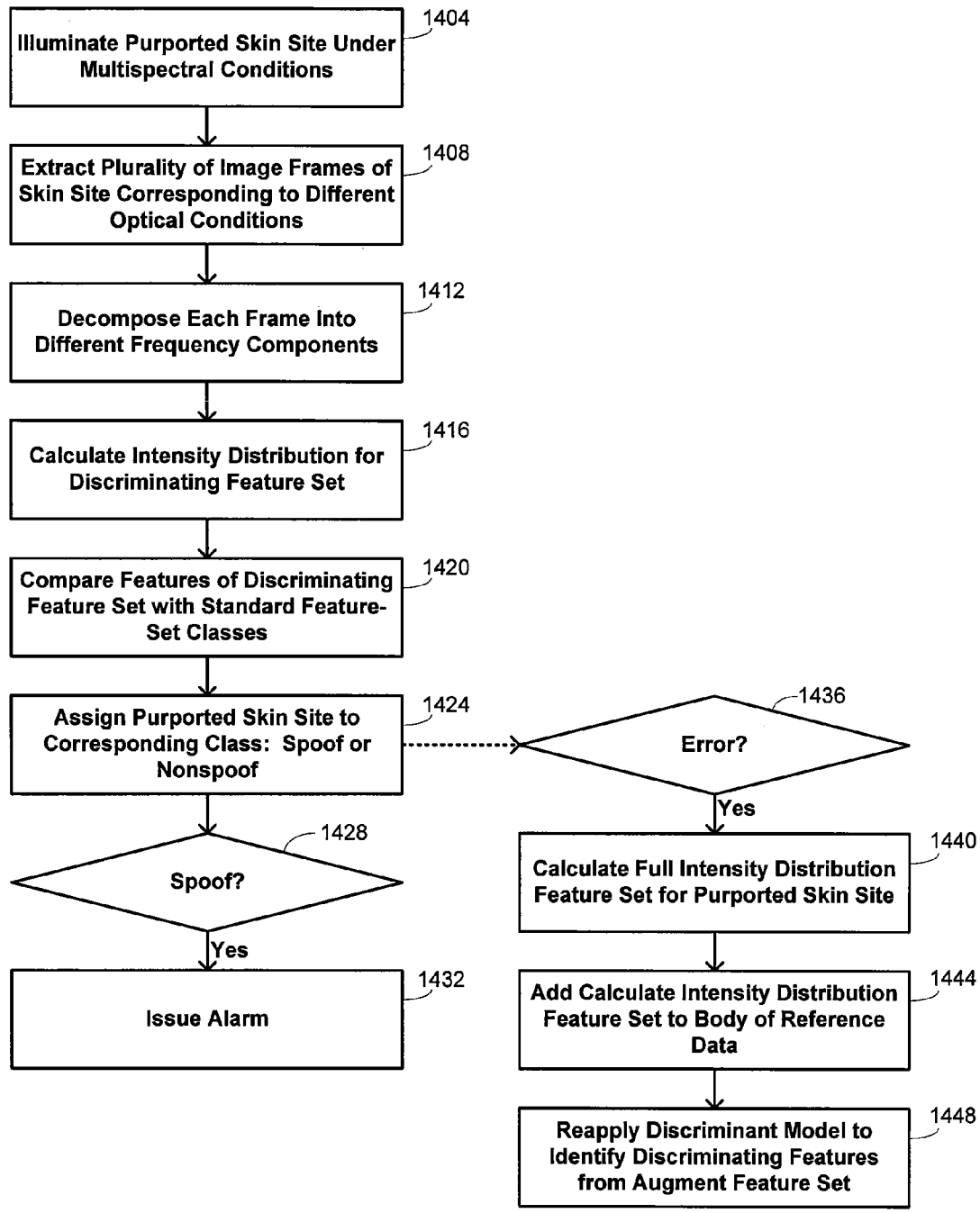
FIG. 14 is a flow diagram summarizing methods for discriminating between legitimate and spoof presentations of fingerprints through a comparison of discriminating features.

Once the system has been trained as described above, it may be used in biometric applications to identify possible spoofs. A summary is provided with the flow diagram of FIG. 14 of methods that may be used to classify samples presented for biometric applications.

The method begins at block 1404 by illuminating a purported skin site under multispectral conditions, with the method attempting to classify the purported skin site as a true skin site or as a spoof. As previously noted, the multispectral data that are collected may advantageously be used for biometric identification, but this is not a requirement of the invention and the methods for classifying the purported skin site may be used in conjunction with any type of biometric identification method, or may be used in isolation for certain specialized applications. A plurality of image frames of the purported skin site are extracted from the multispectral data at block 1408. These image frames correspond to different optical conditions, such as different illumination wavelengths, different polarization conditions, different illumination and/or detection angles, and the like. Each frame is decomposed into different frequency components at block 1412, usually using the same type of decomposition that was used in initial training of the system.

The intensity distribution for a discriminating feature set is calculated at block 1416. The discriminating feature set is generally a subset of the feature set that was initially analyzed during training and corresponds to a set that includes those features determined to have the desired discriminatory power. These features may comprise raw features or transformed features in different embodiments. For instance, in a system trained with the input data used in the example described above, the discriminating feature set might consist of features numbered 62, 63, and 64 since these provided virtually all of the discriminatory power. Under different training scenarios, other features might be included in the discriminating feature set.

The specific selection of a subset of features may be useful for a number of reasons. It may reduce the processing time required to perform classifications after the system has been trained. In addition, those features that have relatively low discrimination power could add more noise to the classification and increase the spoof-detection errors. Exclusion of such features from the method may thus improve both the speed and reliability of classifications.

The values calculated for the discriminating feature set are used at block 1420 to perform a comparison with the standard feature-set classes to assign the purported skin site to a spoof or nonspoof classification at block 1424. Such a comparison may proceed in different ways in different embodiments. For instance, results like those shown in FIG. 13 could be used to define regions of a space spanned by the discriminating features that correspond to the discriminating feature set. While FIG. 13 shows an example in which the space is two-dimensional, the inclusion of a different number of features may result in spaces of three, four, or more dimensions. Assignment of the purported skin site may be made according to a unilateral assignment based on where calculated distribution for the discriminating feature set maps into the space.

In other cases, statistical techniques may be used to perform a comparison of the results calculated at block 1416 with the training results to determine a confidence level that the purported skin site is a true skin site. The use of statistical techniques in this way permits the sensitivity of the method to be adjusted. For instance, relatively low-security applications might permit validation of a purported skin site whenever the confidence that it is consistent with a true skin site is greater than a 75% confidence level; conversely, very-high-security applications might impose a confidence level requirement of 99%, with intermediate applications using intermediate confidence levels.

If the purported skin site is classified as a spoof as checked at block 1428, an alarm may be issued to prompt further action. The alarm may take the form of an audible or visible alarm in different embodiments, or may take the form of restricting activity of the person presenting the purported skin site. In some instances, the alarm may initiate further investigation of the purported skin site, the activation of law-enforcement personnel, or any of a variety of other responses, depending on the specific application.

In some instances, a check may be made to verify whether the determination of the system was correct. That information may be used for additional training of the system, particularly in those cases where the determination was erroneous either because it identified a true skin site as a spoof or identified a spoof as a true skin site. A check may accordingly be made in some embodiments at block 1436, prompting a calculation of the full intensity distribution feature set for the purported skin site at block 1440. Such a calculation is not restricted to the discriminating feature set, but instead duplicates the type of calculation performed at blocks 416 and 436 of FIG. 4. This complete distribution feature set is added to the body of reference data that were used in deriving the discriminating feature set at block 1444. This permits the discriminant model to be applied again at block 1448. This application is generally the same as the application at block 444 of FIG. 4, but the inclusion of additional data may result in a different determination of those features that are most discriminating. This may be particularly true when data have been added to the determination that yielded an incorrect result with the prior data set.

EXAMPLE

The inventors extended the example described above to test classification accuracy. Table II below summarizes classification errors that may be associated with different feature groups. In one column, results are presented for classification errors that result when a particular group is excluded and all other groups are included. This is contrasted with results in another column for classifications that result when only a particular group is included.

TABLE II

| | Classification Error (%) | |
|---|---|---|
| Feature Group | Group Excluded | Only Group Included |
| Medium-frequency/ low-frequency ratio | 1.9 | 15.0 |
| High frequency | 1.7 | 11.0 |
| Medium frequency | 1.5 | 14.7 |
| Low frequency | 2.7 | 5.3 |
| All Data | | 1.4 |

These results confirm the general result that lower-frequency features generally provide greater discriminatory power.

Table III below provides results that compare classification errors for features that are insensitive to illumination level with those that are sensitive to illumination level.

TABLE III

| Features | Classification Error (%) | Intensity Insensitivity |
|---|---|---|
| P30,P70 (All frequency decomposition levels) | 2.4 | None |
| P30/P70 (All frequency decomposition levels) | 9.6 | Global |
| P30, P70, P30/P70 (Ratio of frequency decomposition levels) | 12.9 | Global and local |
| All features | 1.4 | Mixed |

While it is generally desirable that features be insensitive to illumination intensity, the results of Table III show that the insensitive features may not be as powerful as the features that have some sensitivity to illumination intensity. It may thus be advantageous in some embodiments to have a feature set that includes both features that are insensitive to illumination intensity and features that have some sensitivity to illumination intensity.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of performing a biometric function on a purported skin site, the method comprising:
    illuminating the purported skin site under a plurality of distinct optical conditions;
    receiving spatially distributed multispectral light reflected from the purported skin site;
    deriving a feature value for each of a plurality of features from the received light;
    performing a comparison of the derived feature value for each of the plurality of features with reference feature values; and
    determining whether the purported skin site is a true skin site from the comparison.

2. The method recited in claim 1 wherein deriving the feature value comprises extracting a plurality of images from the received light, each of the images corresponding to an image under one of the plurality of distinct optical conditions.

3. The method recited in claim 2 wherein deriving the feature value further comprises decomposing each of the plurality of images into a plurality of different frequency spatial components.

4. The method recited in claim 3 wherein decomposing each of the plurality of images comprises performing a wavelet decomposition.

5. The method recited in claim 3 wherein deriving the feature value further comprises calculating a ratio of a first of the different spatial frequency components to a second of the different spatial frequency components.

6. The method recited in claim 3 wherein deriving the feature value further comprises calculating an intensity distribution for each of the different spatial frequency components.

7. The method recited in claim 6 wherein at least one of the features is substantially invariant to illumination intensity.

8. The method recited in claim 7 wherein the at least one of the features comprises a ratio of an intensity at a first predetermined percentile of the intensity distribution to an intensity at a second predetermined percentile of the intensity distribution.

9. The method recited in claim 7 wherein at least a second of the features varies with illumination intensity.

10. The method recited in claim 9 wherein:
    the at least one of the features comprises a ratio of an intensity at a first predetermined percentile of the intensity distribution to an intensity at a second predetermined percentile of the intensity distribution; and the at least a second of the features comprises a difference between the intensity at the first predetermined percentile and the intensity at the second predetermined percentile.

11. The method recited in claim 6 wherein at least one of the features varies with illumination intensity.

12. The method recited in claim 1 wherein determining whether the purported skin site is a true skin site comprises determining that the purported skin site is not a true skin site, the method further comprising issuing an alarm to identify the purported skin site as a spoof.

13. The method recited in claim 1 further comprising performing a biometric identification from the received light.

14. A biometric sensor comprising:
an illumination subsystem disposed to illuminate a purported skin site of an individual;
a detection subsystem disposed to receive light reflected from the purported skin site; and
a controller in communication with the illumination subsystem and with the detection subsystem, the controller including:
instructions for illuminating the purported skin site with the illumination subsystem under a plurality of distinct optical conditions during a single illumination session;
instructions for receiving spatially distributed multispectral light reflected from the purported skin site with the detection subsystem;
instructions for deriving a feature value for each of a plurality of features from the received light;
instructions for performing a comparison of the derived feature value for each of the plurality of features with reference feature values; and
determining whether the purported skin site is a true skin site from the comparison.

15. The biometric sensor recited in claim 14 wherein the instructions for deriving the feature value comprises instructions for extracting a plurality of image representations from the received light, each of the image representations corresponding to an image under one of the plurality of distinct optical conditions.

16. The biometric sensor recited in claim 15 wherein the instructions for deriving the feature value further comprise instructions for decomposing each of the plurality of image representations into a plurality of different spatial frequency components.

17. The biometric sensor recited in claim 16 wherein the instructions for decomposing each of the plurality of image representations comprise instructions for performing a wavelet decomposition.

18. The biometric sensor recited in claim 16 wherein the instructions for deriving the feature value further comprise instructions for calculating a ratio of a first of the different spatial frequency components to a second of the different spatial frequency components.

19. The biometric sensor recited in claim 16 wherein the instructions for deriving the feature value further comprise instructions for calculating an intensity distribution for each of the different spatial frequency components.

20. The biometric sensor recited in claim 19 wherein at least one of the features is substantially invariant to illumination intensity.

21. The biometric sensor recited in claim 20 wherein the at least one of the features comprises a ratio of an intensity at a first predetermined percentile of the intensity distribution to an intensity at a second predetermined percentile of the intensity distribution.

22. The biometric sensor recited in claim 20 wherein at least a second of the features varies with illumination intensity.

23. The biometric sensor recited in claim 22 wherein:
the at least one of the features comprises a ratio of an intensity at a first predetermined percentile of the intensity distribution to an intensity at a second predetermined percentile of the intensity distribution; and
the at least a second of the features comprises a difference between the intensity at the first predetermined percentile and the intensity at the second predetermined percentile.

24. The biometric sensor recited in claim 19 wherein at least one of the features varies with illumination intensity.

25. The biometric sensor recited in claim 14 wherein controller determines that the purported skin site is not a true skin site, the controller further comprising instructions for issuing an alarm to identify the purported skin site as a spoof.

26. The biometric sensor recited in claim 14 wherein the controller further comprises instructions for performing a biometric identification from the received light.

* * * * *